United States Patent
Mandava et al.

(10) Patent No.: US 7,243,352 B2
(45) Date of Patent: Jul. 10, 2007

(54) DISTRIBUTED PROCESS RUNNER

(75) Inventors: Ramesh B. Mandava, San Jose, CA (US); Bhakti H. Mehta, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 778 days.

(21) Appl. No.: 10/306,556

(22) Filed: Nov. 27, 2002

(65) Prior Publication Data

US 2004/0103413 A1 May 27, 2004

(51) Int. Cl.
*G06F 9/46* (2006.01)
*G06F 15/16* (2006.01)
*G06F 9/44* (2006.01)

(52) U.S. Cl. ............ 718/104; 718/100; 718/102; 709/201; 709/202; 709/203; 717/124

(58) Field of Classification Search ........ 709/223–226, 709/201–203; 719/330; 717/125, 124; 714/4; 702/119; 718/100–108
See application file for complete search history.

(56) References Cited

U.S. PATENT DOCUMENTS

| | | | | |
|---|---|---|---|---|
| 6,112,243 | A * | 8/2000 | Downs et al. ............ | 709/226 |
| 6,463,457 | B1 * | 10/2002 | Armentrout et al. ...... | 709/201 |
| 6,708,324 | B1 * | 3/2004 | Solloway et al. ......... | 717/124 |
| 6,775,824 | B1 * | 8/2004 | Osborne et al. .......... | 717/125 |
| 6,961,937 | B2 * | 11/2005 | Avvari et al. ............. | 718/104 |
| 6,993,448 | B2 * | 1/2006 | Tracy et al. .............. | 702/119 |
| 2002/0042687 | A1 * | 4/2002 | Tracy et al. .............. | 702/119 |
| 2003/0014510 | A1 * | 1/2003 | Avvari et al. ............. | 709/223 |
| 2003/0051188 | A1 * | 3/2003 | Patil ....................... | 714/4 |
| 2003/0120829 | A1 * | 6/2003 | Avvari et al. ............. | 709/330 |
| 2003/0131088 | A1 * | 7/2003 | Morrissey et al. ........ | 709/223 |
| 2003/0200252 | A1 * | 10/2003 | Krum ...................... | 709/102 |

OTHER PUBLICATIONS

Berger et al., "Model Driven Testing", DNA Interprises, Inc., Teradyne Software and System Test, 1997, pp. 1-4.*
Waldo, "The Jini Architecture for Network-Centric Computing", ACM, 1999, pp. 76-82.*

* cited by examiner

*Primary Examiner*—Meng-Al T. An
*Assistant Examiner*—Jennifer N. To
(74) *Attorney, Agent, or Firm*—Martine Penilla & Gencarella, LLP

(57) ABSTRACT

A method for processing a computer software process including a task file is provided. The method includes designating a group of available processing resources to execute the task file that includes task groups with each task group including a plurality of tasks. The method also includes scheduling the task groups in the task file for execution with a plurality of remaining processing resources, each running a client controller component code. Further included is obtaining access to a set of free remaining processing resources of the plurality of remaining processing resources, each having a set of criteria matching a set of requirements of each task in a particular task group. The method also includes executing tasks in the particular task group when access to all the free remaining resources in the set of the free remaining processing resources have been granted. Also included is generating an execution result report.

20 Claims, 14 Drawing Sheets

| Test Systems ||||
|---|---|---|---|
| Available | OS | Busy | OS |
| 114c | MAC 10 | 114b | Linux |
| 114e | Windows | 114d | Solaris |
| 114h | Solaris IA | 114f | Solaris |
| 114i | MAC 10 | 114l | MAC 10 |
| 114j | Windows | 114m | Linux |
| 114k | Windows | 114n | Solaris |
| | | | Refresh |

FIG. 10A

| Test Systems ||||
|---|---|---|---|
| Available | OS | Busy | OS |
| 114b | Linux | 114d | Solaris |
| 114c | MAC 10 | 114f | Solaris |
| 114e | Windows | 114l | MAC 10 |
| 114h | Solaris IA | 114n | Solaris |
| 114m | Linux | 114i | MAC 10 |
| 114k | Windows | 114j | Windows |
| | | | Refresh |

FIG. 10B

| Test Systems ||||
|---|---|---|---|
| Available | OS | Busy | OS |
| 114b | Linux | 114f | Solaris |
| 114c | MAC 10 | 114i | MAC 10 |
| 114d | Solaris | 114j | Windows |
| 114e | Windows | 114k | Windows |
| 114h | Solaris IA | 114m | Linux |
| 114l | MAC 10 | 114n | Solaris |
| | | | Refresh |

FIG. 10C

DISTRIBUTED PROCESS RUNNER

BACKGROUND OF THE INVENTION

1. Field of the Invention

The present invention relates generally to software processing, and more particularly, to methods and systems for intelligently and automatically selecting and utilizing networked computer resources to collectively execute process-flow-based computing operations.

2. Description of the Related Art

In today's fast paced computing world, more and more businesses use the World Wide Web (Web) to provide web services to consumers all over the world. In a simple scenario, a web service provider advertises the service provider's web services by registering the service provider's data with a web registry. In turn, a consumer of the web services (i.e., a client), communicates with the web registry, requesting the web registry to provide the client with information about a service provider satisfying a specific criteria transmitted by the client. The web registry then processes the request so as to locate the service provider that satisfies the particular criteria requested by the client. The registry then provides the client with the Uniform Resource Locater (URL) of the located service provider. Thereafter, if the client finds web services provided by the service provider satisfaction, the client communicates with the selected service provider. This simple scenario, however, rarely occurs.

In reality, web services are offered over the web by multiple service providers registered with several web registries for use by numerous clients. To make matters more complicated, each service provider may be implemented using different technologies (e.g., a net compatible server), each web registry may be implemented using different types of web registry documents (e.g., web service description language (WSDL), and each client can be based on different types of technologies (e.g., Java™ application based client). Further complicating the problems is that each of the service providers, web registries, and clients, may be implemented on different platforms. Accordingly, interactions between each combination of web registry, service provider, and client are rather complex as it may involve communications being based on different technologies and operating systems.

Additionally, communication between the web registries, service providers, and clients are synchronized. For instance, a service provider must ensure that the registry is up and running prior to service provider publishing the service provider's services on the web registry. In a like manner, a client must ensure that the registry is up and running prior to communicating a request for a web service. A client must further be sure that the service provider is running prior to communicating a request to the service provider. Thus far, however, such synchronization requirements have not been addressed, causing premature termination of communications between service providers, registries, and clients. In such scenarios, interactions must be restarted and the web services be re-dispatched. Additionally, the failed service provider, registry, or client must be restarted manually, requiring human intervention.

As the web services are being widespreadly used, to avoid such scenarios, the interactions between different service providers, registries, and clients are tested. Particularly, each combination of interaction between the web registries, service providers, and clients are tested to ensure the reliability of the web services as well as the web registries, service providers, and clients. This is important, as different service providers, registries, and clients can be implemented on diverse platforms using different technologies. Additionally, properly testing the interactions between the web registries, service providers, and clients must further ensure synchronization problems associated with the prior art.

Thus far, interactions between the web registries, service providers, and clients are typically performed by stand-alone computers or a network of computer resources. When using a stand-alone computer system, separate stand-alone computers are manually programmed to run tests selected by a user. Comparatively, if a network of computer resources is used, the user allocates a number of computer resources to test a particular interaction. Predominantly, the user manually selects a group of selected computer resources or adds and deletes computer resources to the network, programs the master computer system and the server, initiates the running of the user-selected test, and runs the test on the group of dedicated computer systems coupled to the server.

In either scenario, a heavy user interface is required to test the interactions, schedule the running of specific tests on the system resources, add and delete the system resources, keep track of the system resources and their respective hardware and software configurations, and maintain the system resources. Additionally, in either case, interactions are tested by dedicated system resources, designed to solely be used for testing the interactions between the registries, service providers, and clients.

By way of example, to test interactions scheduled to be performed synchronously, a test developer is required to manually initiate the testing process on a plurality of system resources following a particular menu. The menu provides the user the order in which specific tests are required to be run (e.g., synchronously, in parallel, or sequentially). Thus, testing a certain interaction requires the presence of a test developer at all times so that different tests can be initiated in accordance to the schedule set in the menu.

Furthermore, if an exception occurs during testing of an interaction between the registries, service providers, and clients, the testing process is halted. For instance, if an exception is occurred during testing an interaction between the registry and the client, the interaction is terminated, requiring that the client and the registry to be restarted. If restarting of the client and the web registry does not resolve the exception, the test developer on duty must communicate with the software programmer in charge of developing the test source code so as to resolve the exception.

Additionally, currently, if a system resource crashes or a response has not been received from a system resource during testing a particular interaction, testing the particular interaction continues indefinitely. In certain situations, to avoid such problems, testing the interaction is interrupted manually by the test developer present.

One significant limitation of the current state of testing the web services and interactions between the registries, service providers, and clients is the extent of human intervention and significant role of humans. Requiring the presence of test developers to manually initiate, schedule, and interrupt the testing is very costly, is a of waste of resources, not to mention, very time consuming. At times, human error further exacerbates this limitation. Another limitation involves wasting of computer resources, as the computer resources are solely dedicated to testing the web services and the interactions between the web registries, service providers, and clients.

In view of the foregoing, there is a need for a flexible methodology and system capable of selecting and utilizing dynamic, cross-platform computer resources to process multiple process-flow-based computer software processes using diverse technologies and platforms with minimal human intervention.

SUMMARY OF THE INVENTION

Broadly speaking, the present invention fills these needs by implementing a distributed process runner (DPR) system to manage and execute process-flow-based computer programs implementing different technologies and platforms using impromptu, cross-platform, distributed processing systems managed by a distributed processing framework (DPF) system. In one embodiment, the DPR system is a distributed test runner (DTR) system designed to manage and schedule execution of web services and interactions between web service providers, web registries, and web clients on dynamically networked cross-platform test systems implementing diverse technologies. It should be appreciated that the present invention can be implemented in numerous ways, including as a process, an apparatus, a system, a device, or a method. Several inventive embodiments of the present invention are described below.

In one embodiment, a processing system is provided. The processing resource includes a computer system, a main processing resource, and a plurality of remaining processing resources. The computer system executes a system controller component and a service component that includes a look up service. The main processing resource executes a server controller component and is configured to register with the look up service indicating the availability of the main processing resource to process a task in a task group of a plurality of software processing task groups. Each of the plurality of remaining processing resources executes a client controller component. The plurality of remaining processing resources is configured to register with the look up service so as to indicate the availability of each of the plurality of remaining processing resources to process a given task in the software processing task groups. Each software processing task group includes a plurality of tasks with each task having a set of requirements. The system controller component searches the look up service so as to obtain data about the main processing resource and the remaining processing resources so as to provide the server controller component data about the main processing resource and the remaining processing resources. The server controller component communicates with each client controller component so as to locate a set of free remaining processing resources to execute tasks in a particular software processing task group that follow a task-flow-based schedule.

In another embodiment, a method for processing a computer software process including a task file is provided. The method includes designating a group of available processing resources to execute the task file. The task file includes task groups with each task group including a plurality of tasks. The method also includes scheduling the task groups in the task file for execution with a plurality of remaining processing resources, each running a client controller component code. Further included in the method is obtaining access to a set of free remaining processing resources of the plurality of remaining processing resources, each having a set of criteria matching a set of requirements of each task in a particular task group. The method also includes executing tasks in the particular task group when access to all the free remaining resources in the set of the free remaining processing resources have been granted. Also included is generating an execution result report.

In yet another embodiment, a process execution distributor, scheduler, and management system is provided. The system includes a main processing resource executing a server controller component. The main processing resource registers with a look up service indicating the availability of the main processing resource to schedule software processing task groups for execution. Each software processing task group includes a plurality of tasks with each task having a set of requirements. The main processing resource communicates with a system controller component so as to obtain data as to execution of a particular software processing task group configured to follow a task-flow-based schedule.

In still another embodiment, a processing resource is provided. The processing resource includes a client controller component configured to communicate with a server controller component being run on a main processing resource. The processing resource registers with a look up service indicating the availability of the processing resource to process a software processing task. The processing resource is configured to be assigned the execution of a software processing task in a plurality of software processing task files. The system controller component searches the look up service so as to obtain data about the main processing resource and the processing resource available to execute the software processing task.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 10A depicts a simplified snap shot of available and busy processing resources at a given time, in accordance with still another embodiment of the present invention.

FIG. 10B depicts a simplified snap shot of available and busy processing resources at a given time, in accordance with still another embodiment of the present invention.

FIG. 10C depicts a simplified snap shot of available and busy processing resources at a given time, and a test system, in accordance with still another embodiment of the present invention.

DETAILED DESCRIPTION OF THE PREFERRED EMBODIMENTS

Figure 1:
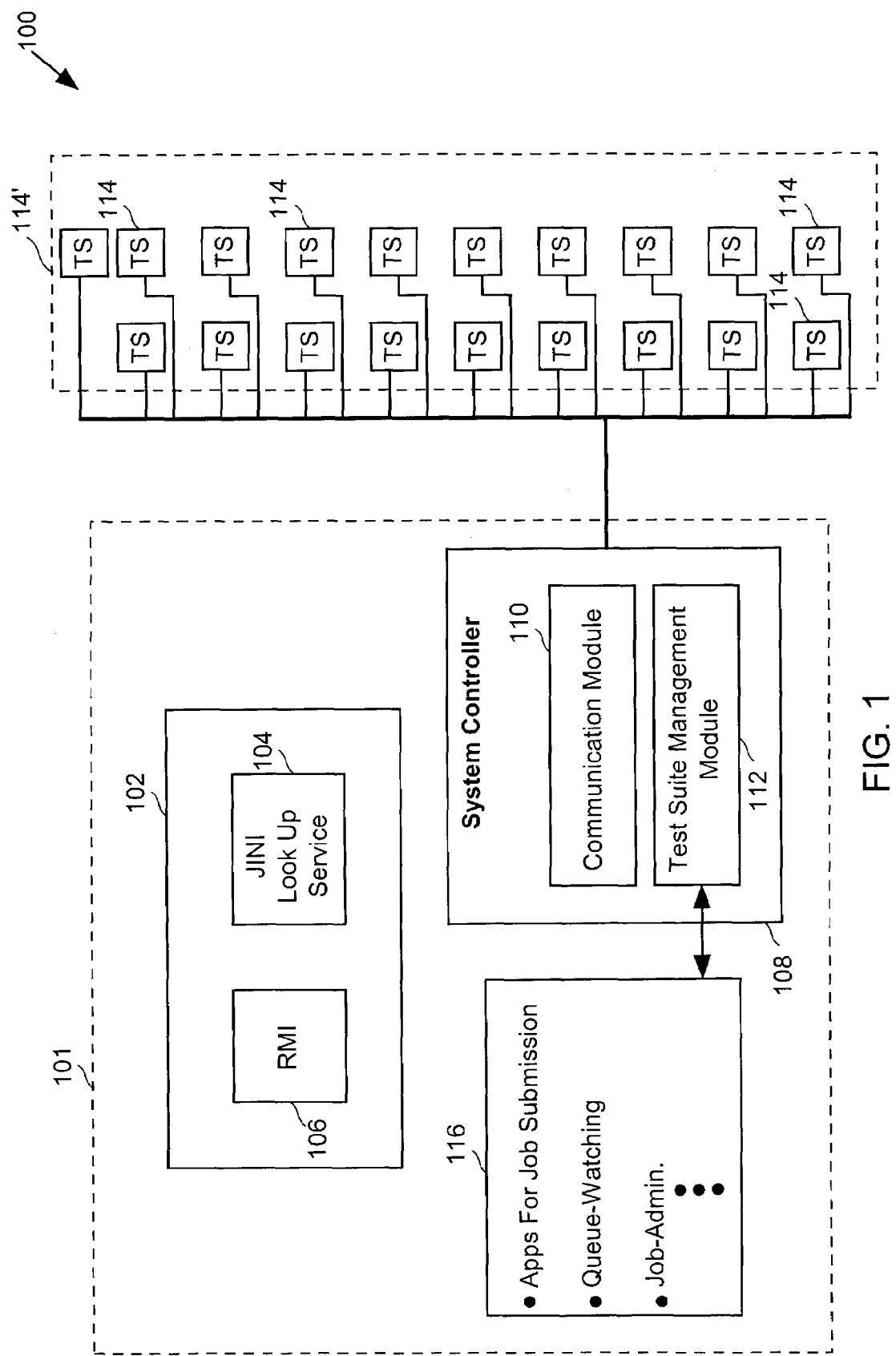
FIG. 1 is a block diagram illustrating a distributed test framework (DTF) system, in accordance with one embodiment of the present invention.

An invention for a distributed process runner (DPR) system to manage and schedule execution of process-flow-based processes utilizing cross-platform, dynamically networked, distributed computer systems implementing diverse technologies and operating systems is disclosed. The embodiments of the present invention are capable of intelligently and automatically selecting and utilizing computer systems of a dynamic network of distributed computer systems having either the same or different software/hardware configurations to synchronously execute process-flow-based processes.

As used herein, an "ad-hoc" or a "dynamic" network is defined as a network in which the computer resources may be part of the network temporarily and for a specific length of time (i.e., spontaneous). In one example, the DPR system of the present invention implements the Jini™ (hereinafter "Jini") technology to provide spontaneous interaction between its components. In this manner, the computer systems attach to and detach from the ad-hoc network of processing resources (e.g., computer resources) without disturbing the DPR system. Accordingly, the computer resources of the present invention are not limited to executing processes submitted to the DPR system of present invention.

In one exemplary embodiment, the distributed process runner (DPR) is a distributed test runner (DTR) configured to manage and monitor testing of an exemplary process using a plurality of dynamic test systems. In one example, the system controller of a distributed test system framework (DTF) provides the DTR with all available data about all the test systems 114a–114e, registered with the look up service.

In one embodiment, DTF launches a server controller on a test system having a desired platform. Thereafter, the server controller obtains all available data about the located test systems from the system controller (e.g., the Internet Protocol (IP) address for each of the test systems, operating system types, machines names, etc.). Then, the server controller designates all the remaining test systems as distributed test systems designed to execute tasks in a plurality of task files. To designate the remaining test systems, in one example, the server controller launches client server on each of the respective test system.

At this point, the server controller communicates with the client servers so as to coordinate communications. In one example, the server controller starts task execution by obtaining each task file in a task directory designated by the user. Thereafter, task-flow-based scheduling provided in each task file is implemented by the server controller to schedule each task in each task group of each task file. For instance, the server controller determines the number of tasks in the first task group of the first task file as well as their respective operating systems types. Then, the server controller searches the available test systems so as to find test systems having operating systems matching those required to execute the tasks in the first task group.

In one example, the DPR implements a distributed test framework DTF system. The DTF system is configured to manage test suite execution on cross-platform dynamically networked computer systems. In one implementation, the DTF system includes a server computer system and a plurality of ad-hoc network of processing resources configured to spontaneously interact implementing the Jini technology. The server computer system is configured to include a Jini look up service and a system controller configured to manage the processing of the submitted test suites. In one instance, the plurality of computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

Below is a brief introduction to Enterprise JavaBeans (EJB) application as another embodiment of the present invention implements the Enterprise JavaBeans (EJB) architecture. EJB is part of a larger overall technology known as the Java 2 Platform, Enterprise Edition (J2EE) developed by Sun Microsystems, Inc. J2EE provides architecture for developing, deploying, and executing applications in a distributed-object environment.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In one example, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components execute. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance lifecycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As Java™ (hereinafter "Java") programming language is implemented in Jini and EJB architecture, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews to Jini, EJB architecture, and Java as they relate to the present invention in mind, for ease of understanding, a detailed description of the Distributed Processing Framework System is provided in Section I, and a detailed description of the Distributed Process Runner will be provided in Section II.

I. Distributed Processing Framework System reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it must be noted that in a different embodiment, the system controller 108 may implement any suitable mechanism to manage the communication between the system controller 108 and the distributed test systems 114 (e.g., Jini, RMI, TCP/IP Sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working hours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 of the present invention can physically be divided into two groups, logically, the DTF system 100 of the present invention is comprised of three over all parts: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

Figure 2:
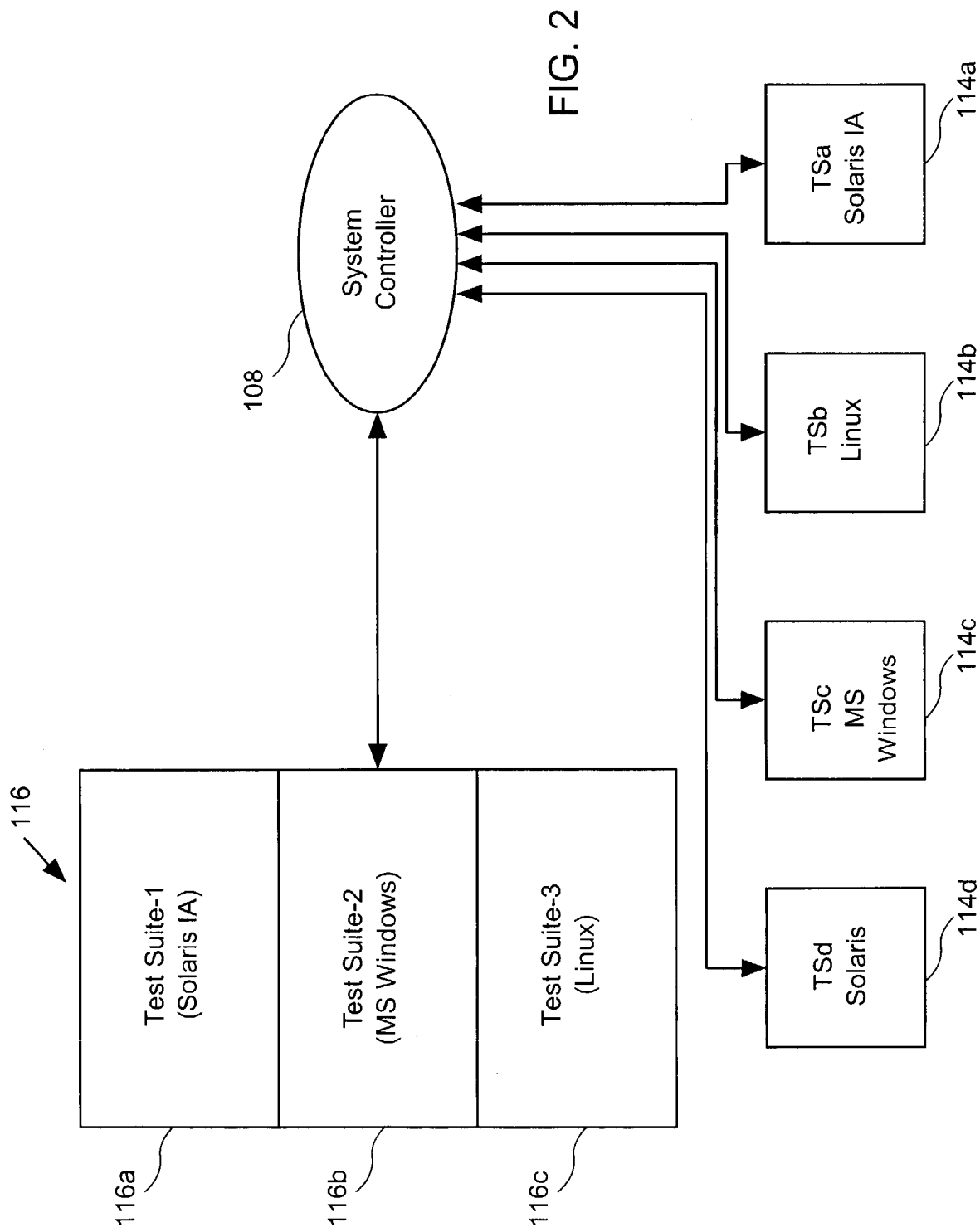
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the present invention to intelligently locate a test system 114 available to execute a test suite is illustrated, in accordance with one embodiment of the present invention. As shown, an inqueue directory 116 contains a plurality of test execution requests 116*a*, 116*b*, and 116*c*. In accordance with one embodiment of the present invention, once the system controller 108 is initiated, the system controller 108 is designed to read each test execution request 116*a*–116*c* contained within the inqueue directory 116. As shown, each test suite request 116*a*–116*c* must be executed by a test system 114 capable of running the test execution request requirements. For instance, each of the test execution requests 116*a*, 116*b*, and 116*c* must be run on a Solaris IA™ test system, a Microsoft (MS) windows test system, or a Linux™ test system, respectively. As will be described in more detail below, the DTF system 100 of the present invention has the capability to advantageously locate an available test system from a plurality of ad-hoc network of test systems 114*a*, 114*b*, 114*c*, and 114*d* to execute each of the test execution requests 116*a*–116*c*.

As shown in the embodiment depicted in FIG. 2, each of the test systems 114*a*–114*d* has a different software and hardware configuration. For instance, while the test system 114*a* is run on Solaris IA™ and the test system 114*b* is run on Linux™, the test systems 114*c* and 114*d* are programmed to run on Solaris, MS windows, and Solaris™, respectively. As will be discussed in more detail below, the machine service for each test system 114*a*–114*c* registers the respective test system 114*a*–114*c* with the Jini look up service using the Jini attributes. Particularly, the embodiments of the present invention are configured to register the hardware and software configuration for each test system 114*a*–114*d* with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114*a*, 114*c*, and 114*b* to execute the test suite requests 116*a*–116*c*, respectively.

Figure 3:
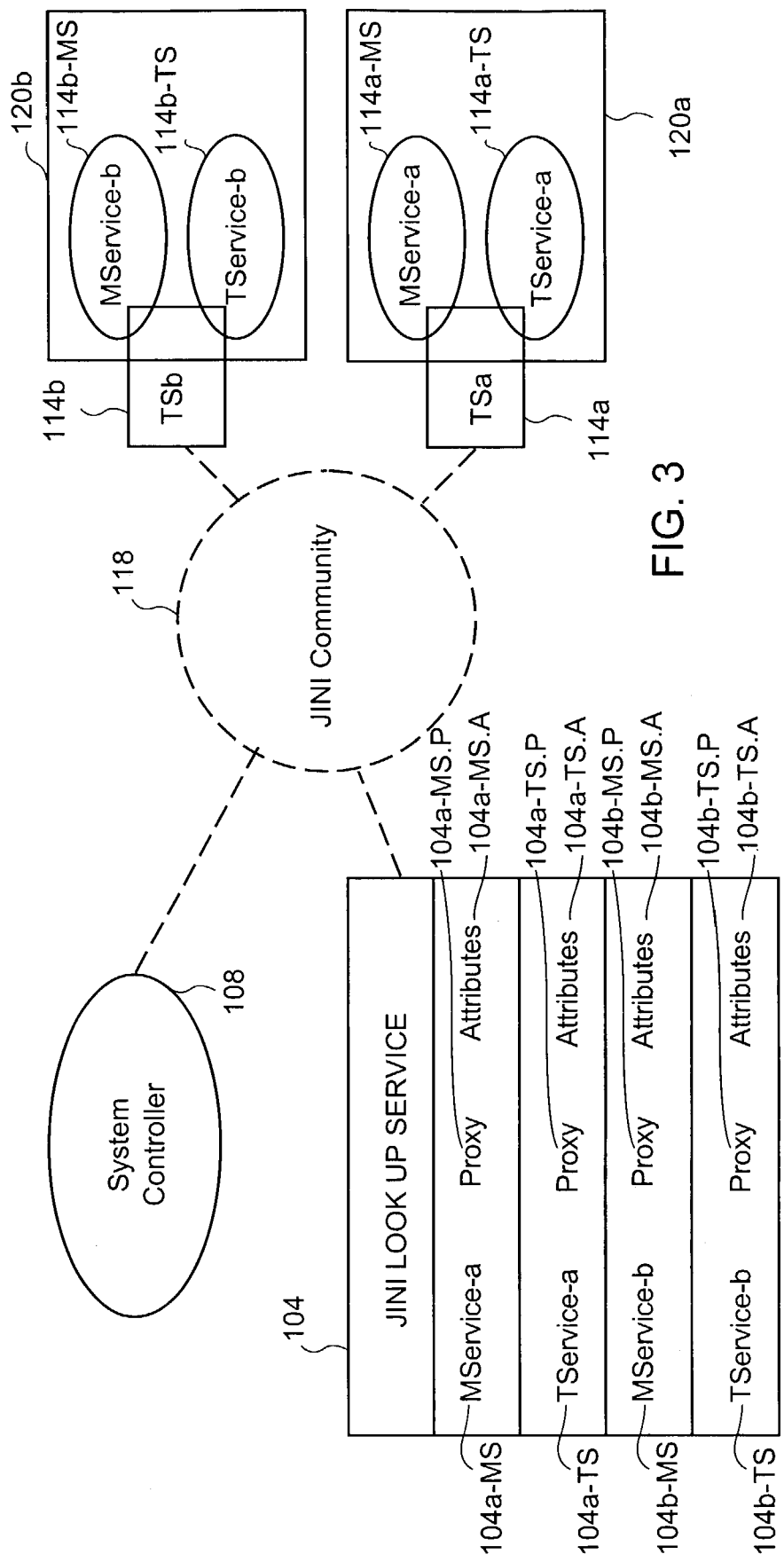
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114*b* and 114*a*, the system controller 108, and the Jini look up service 104 communicate to each other using Jini. In one example, the system controller 108, the Jini look up service 104, and the test systems 114*a* and 114*b* and all the other resources that are Jini enabled form a virtual Jini community 118.

As shown, the test system 114*a* runs an agent process 120*a* responsible for notifying the Jini look up service 104 of the existence and configuration of the test system 114*a*. In one example, the agent 120*a* is also designed to export a downloadable image of itself. Beneficially, the downloadable image allows the system controller 108 to ask the test system 114*a* to initiate running a test execution request while interacting with the test system 114*a* as the test execution request is being processed.

The illustrated agent 120*a* involves two Jini services, machine service 114*a*-MS and test service 114*a*-TS. The function of the machine service 114*a*-MS is to advertise the availability of the test system 114*a*, the characteristics of the test system 114*a*, and the ability of the test system 114*a* to launch a test execution request. Additionally, the machine service 114*a*-MS is designed to be present on the test machine 114*a* at all times. As such, the machine service 114*a*-MS is initiated on the test system 114*a* at the start-up time and is configured to remain active on the test system 114*a* until the test system 114*a* is shut down.

Comparatively, the test service 114*a*-TS is a module configured to encapsulate the test execution request. As designed, the test service 114*a*-TS is spawned by the machine service 114*a*-MS and is subsequently launched when the machine service 114*a*-MS receives a request to start running a test execution request from the system controller 108. Specifically, the new test service 114*a*-TS is spawned based on the test execution request type. By way of example, in one embodiment, the machine service 114*a*-MS spawns separate test systems 114*a*-TS when running, ant based test suites, shell-type test suites, and other test suites such as Tonga-type, JCK-type, JTREG-type, etc. However, one having ordinary skill in the art must appreciate that in a different example, the machine services of the DTF system of the present invention are configured to spawn other suitable test systems. As shown, similar to test system 114*a*, the test system 114*b* is configured to include an agent 120*b* designed to include a machine system 114*b*-MS and a test system 114*b*-TS.

As will be discussed in more detail below and as shown in the implementation of FIG. 3, the machine service 114*a*-MS and test service 114*a*-TS, respectively, register Jini attributes 104*a*-MS.A and 104*a*-TS.A of the test system 114*a* with the Jini look up service 104. For instance, in one embodiment, the sequence of events in registering the machine service 114*a*-MS and test service 114*a*-TS may be as follows: Once the test-system 114*a* discovers and joins the Jini community 118, the test service 114*a*-MS of the test system 114*a* registers with the Jini look up service 104. In this manner, the machine service 114*a*-MS registers a machine service proxy 104*a*-MS.P and the attributes 104*a*-MS.A of the machine service 114*a*-MS with the look up service 104. The Jini attributes 104*a*-MS.A are then used by the system controller 108 to locate a test service having attributes suitable to run the test execution request.

Once the test system 114*a* has been selected to run the test execution request, the machine service 114*a*-MS spawns a test service 114*a*-TS having the same type as the test execution request. As discussed above, the machine service 114*a*-MS is configured to spawn a matching test service 114*a*-TS for each test execution request type. For example, the test system 114*a* may have the attributes to run a Tonga test execution request and a JTREG type test execution request. In such a situation, the Jini look up service 104 will include two test services each running a different type of test execution request. As a consequence, when the processing of one type of test execution request has concluded, the test service 114*a*-TS having substantially the same type can be terminated. Thus, for the most part, the test service 104*a*-TS, 104*a*-TS.A, and 104-TS.P are designed to substantially exist while the test system 114*a* is running a test execution request. In this manner, the system controller 108 can determine whether the test system 114*a* is processing a test execution request. Specifically, this is achieved by the system controller 108 simply querying the Jini look up service 104 as to whether the test system 114*a* has an associated existing test service.

In addition to registering the attributes 104*a*-MS.A and 104*a*-TS.A, the machine service 114*a*-MS and the test system 114*a*-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114*a*. Particularly, once the system controller 108 has selected the test system 114*a* to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114*a* or the machine service 114*a*-MS.

In a like manner, the test service proxy 104-TS.P is the communication channel between the system controller 108 and the test service 114*a*-TS. Thus, similar to the machine service 114*a*-MS, the system controller 108 downloads the test service proxy 104-TS.P from the Jini look up service 104. Thereafter, the system controller communicates with the test service proxy 104-TS.P as if communicating with the test system 114*a* or the test service 114*a*-TS. As shown, in the same manner, the machine service 114*b*-MS and test service 114*b*-TS register their respective machine service proxy 104*b*-MS.P and machine service attributes 104*b*-MS.A as well as the respective test service proxy 104*b*-TS.P and test service attributes 104*b*-TS.A with the Jini look up service 104.

Figure 4:
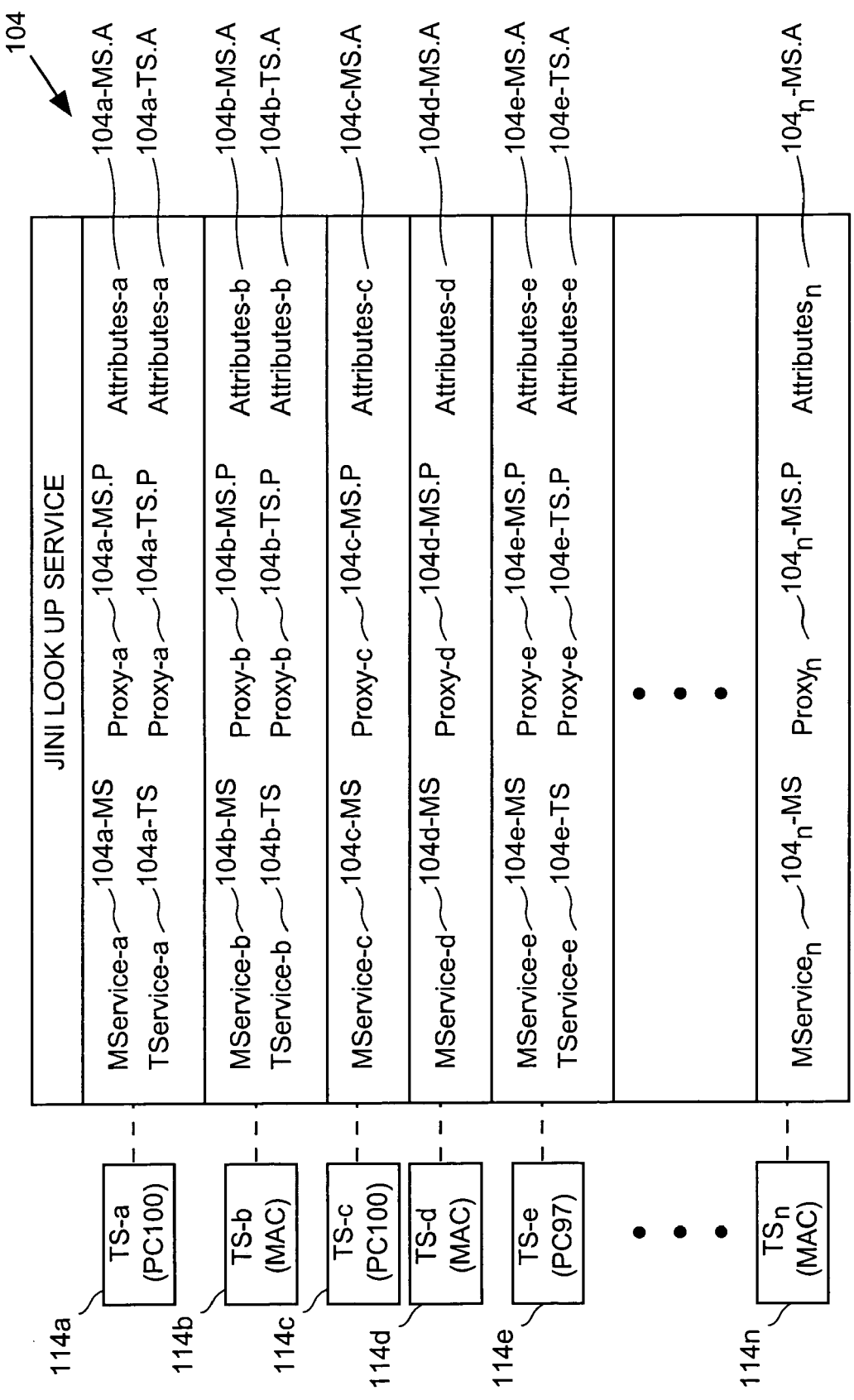
FIG. 4 is a block diagram illustrating the capability of the present invention to locate an available and suitable test system to process a test execution request having a set of specific requirements, in accordance to yet another embodiment of the present invention.

The capability of the present invention to determine the availability of a test system to process a test execution request having a set of specific requirements can further be understood with reference to the block diagram of FIG. 4, in accordance to one embodiment of the present invention. As illustrated, a plurality of test systems 114*a*–114$_n$ respectively being a PC 100, Macintosh, PC 100, Macintosh, PC 97, and Macintosh are registered with the Jini look up service 104. That is, for each test system 114*a*–114$_n$, the Jini look up service 104 contains an associated machine service 104*a*-MS to 104$_n$-MS. In a like manner, for each machine service 104*a*-MS to 104$_n$-MS, the Jini look up service 104 includes a corresponding machine service proxy 104*a*-MS.P to 104$_n$-MS.P and the associated machine service attributes 104*a*-MS.A to 104$_n$-MS.A.

Although for each test system 114*a*–114$_n$ a machine service entry can be found in the Jini look up service 104, only test systems 114*a*, 114*b* and 114*e* have associated test services 104*a*-TS, 104*b*-TS, and 104*e*-TS. Further more, as shown, for each of the test systems 114*a*, 114*b* and 114*e*, the Jini look up service 104 includes the corresponding test system proxy 104*a*-TS.P, 104*b*-TS.P, and 104*e*-TS.P and the respective test system attributes 104*a*-TS.A, 104*b*-TS.A, and 104*e*-TS.A. In one embodiment, having associated test systems in the Jini look up service are the indications of the busy status of the test systems 114*a*, 114*b*, and 114*e*, respectively.

For instance, at this point, when the system controller 108 receives a test execution request requiring to be processed by a PC 100, the system controller 108 searches for an available PC 100 test system. While searching the Jini look up service 104, the system controller 108 will first locate the machine service 104*a*-MS. Despite machine service 104*a*-MS having the required attribute (i.e., being a PC 100), the system controller 108 will have to by pass this entry, as the test system 114*a* is busy. The system controller 108 detects the unavailability of test system 114*a* by the Jini look up service 104 including the test service 104*a*-TS associated with the test system 114*a*. Subsequently, in search of the next available PC 100 test system, the system controller locates machine service 104*c*-MS. However, this time, the Jini look up service does not include a test system associated with the test system 114*c*, revealing the test system 114*c* availability to execute the test execution request.

As will be discussed in more detail below, in one implementation, the lack of a corresponding test service in the Jini look up service 104 occurs once the test execution request has concluded and the test service 104*a*-TS lease with the Jini look up service 104 has expired. Thus, once the test service 104*a*-TS and its associated proxy 104*a*-TS.P and attributes 104*a*-TS.A have been removed from the Jini look up service 104, the test system 114*a* can then be selected to execute a different test execution request. Depending on the type of the test execution request, a different or the same type of test service 114*a*-TS is spawned by the machine service 114*a*-MS, again indicating the busy status of the test system 114*a*.

Figure 5:
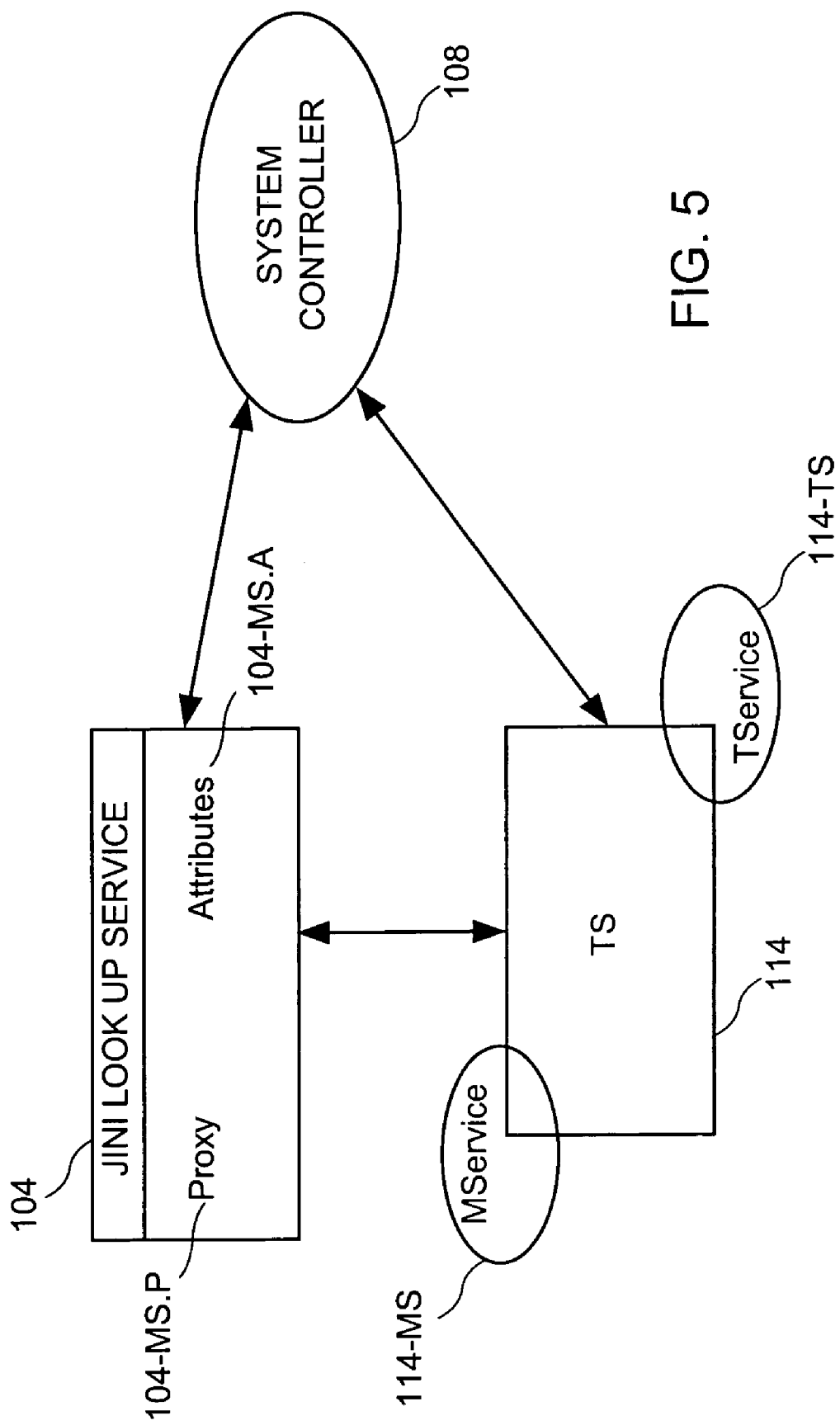
FIG. 5 is a block diagram depicting the one-to-one communication between the system controller, Jini™ look up service, and a test system of a DTF system, in accordance to still another embodiment of the present invention.

Reference is now made to FIG. 5 depicting the one-to-one communication between the system controller 108, Jini look up service 104, and test system 114 of the DTF system, in accordance with one embodiment of the present invention. As shown, enabled by the Jini technology, a machine service 114-MS component of the test system 114 discovers the Jini look up service 104. Thereafter, the machine service 114-MS joins the Jini look up service 104 by registering a plurality of Jini attributes 104-MS.A and a machine system proxy 104-MS.P with the Jini look up service 104.

Seeking a test system to execute a given test execution request, the system controller 108 discovers the Jini look up service 104. Subsequently, the system controller 108 searches the Jini look up service 104 for a test system suitable to run the test execution request. Once the system controller 108 has determined that the machine service attributes 104-MS.A of the test system 114 matches to that required to run the test execution request, the system controller 108 downloads the machine service proxy 104-MS.P from the Jini look up service 104. From then on, the system controller 108 starts communicating with the machine service proxy 104-MS.P as if communicating with the machine service 114-MS. At this point, the system controller 108 communicates with the machine service proxy 104-MS.P requesting the execution of the test execution request.

Subsequent to receiving this request, the machine service 114-MS spawns a test service 114-TS which type matches that required by the test execution request. Next, a test service proxy 104-TS.P and a set of test service attributes 104-TS.A of the test service 114-TS are then registered with the Jini look up service 104. Thereafter, the system controller 108 downloads the test service proxy 104-TS.P and communicates with the test system proxy 104-TS.P as if communicating with the test system 114-TS. Then, the test service 114-TS receives the test execution command from the system controller 108, thus initiating the test execution request.

As was discussed in more detail above, once the test execution has concluded, the test service 114-TS lease with the Jini look up service 104 expires, thus triggering the removal of the test system proxy 104-TS.P and test system attributes 104-TS.A from the Jini look up service 104. In this manner, the system controller 108 associates the availability of the test system 114 to run the next test execution request with the test system 114 lacking of a registered test service proxy 104-TS.P.

Figure 6:
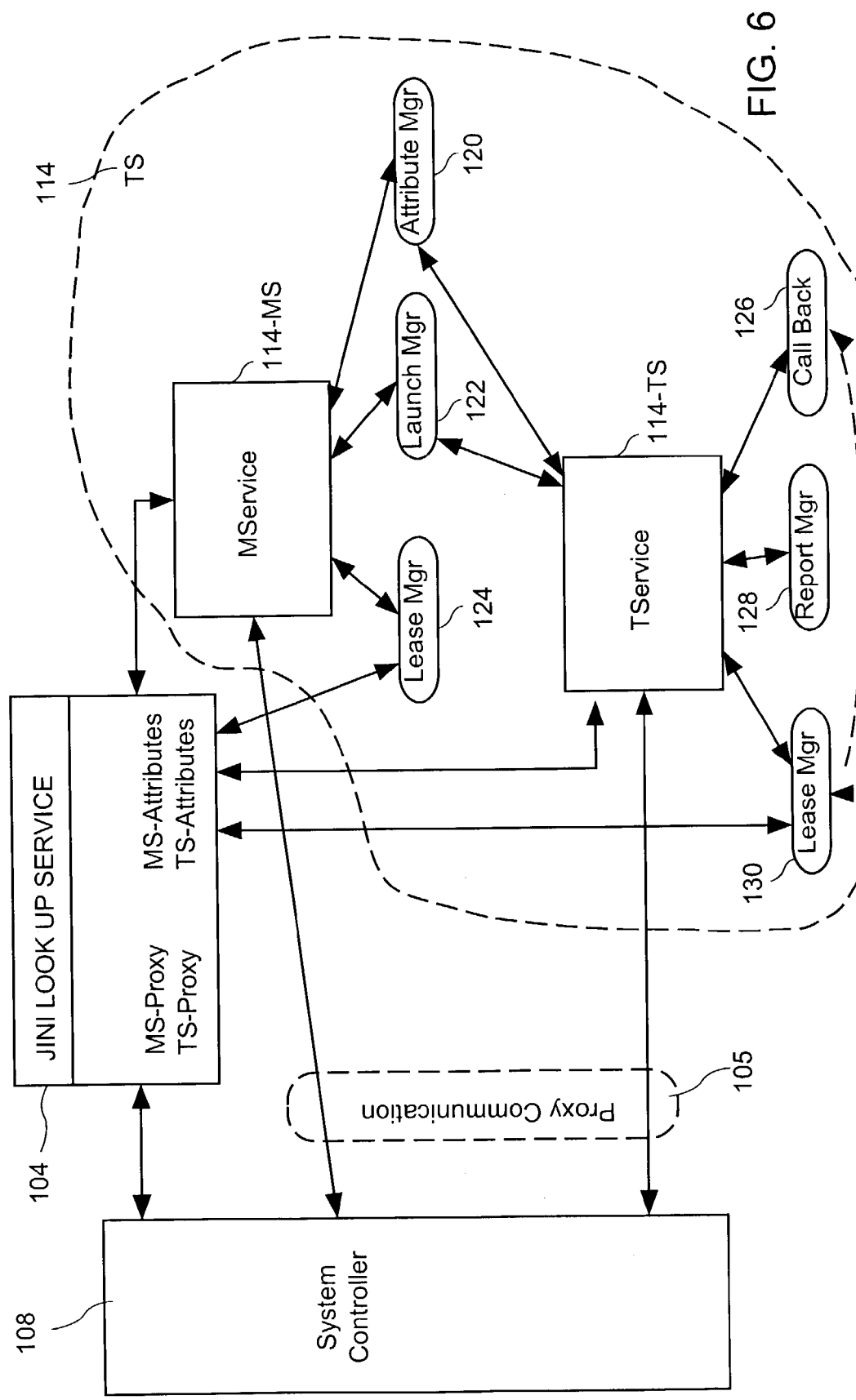
FIG. 6 is a block diagram showing the interaction between the Jini look up service, system controller, and a test system, in accordance with still another embodiment of the present invention.

Proceeding to the block diagram of FIG. 6, the interaction between the Jini look up service 104, system controller 108, and test system 114 can further be understood, in accordance with one implementation of the present invention. As discussed in more detail above, the test system 114 includes a machine service 114-MS and a test service 114-TS. As designed, the machine service 114-MS includes a lease manager 124, a launch manager 122, and an attribute manager 120 while the test system 114-TS includes a call back 126, a report manager 128, and a lease manager 130.

In one example, the interaction between the DTF system components starts by the test system 114 discovering the Jini look up service 104. Subsequent to this discovery, the machine service 114-MS communicates with the attribute manager 120, obtaining the test system 114 attributes. Thereafter, the machine service 114-MS joins the Jini look up service 104 by registering the machine service 114-MS proxy and machine service attributes with the Jini look up service 104. As part of registering the machine service 114-MS with the look up service 104, the lease manager 124 leases the machine service 114 for a specific period of time. That is, the lease manager 124 registers the availability of the test system 114 to execute a test execution request for a specific period of time. However, before the leased period is expired, the lease manager 124 can renew the lease with the Jini look up service 104. In this manner, once the test system 114 is removed from the ad-hoc network of the distributed test systems, the machine service proxy, machine service attributes, test service proxy, and test service attributes are automatically removed from the Jini look up service 104 as soon as the lease is expired.

At this point, the system controller 108 scans the in-queue directory, reading the required attributes for running the first test execution request in the in-queue (i.e., the wait queue). The system controller 108 then searches the Jini look up service 104, looking for a test system having attributes matching to that required by the test execution request (or computer process) to be processed. Once the system controller 108 determines that the test system 114 is a suitable test system to run the test execution request, the system controller 108 downloads the machine service proxy for the test system 114 from the Jini look up service 104. As shown in the embodiment of FIG. 6, once the machine service proxy is downloaded, the system controller 108 use the proxy communication 105 to communicate with the machine service proxy as if communicating with the test system 114. At this point, the test execution is initiated by the system controller 108 dispatching a start execution request to the machine service 114-MS.

Once the launch manager 122 component of the machine service 114-MS receives the system controller 108 request to start test execution, the launch manager 122 spawns the appropriate test service 114-TS. Specifically, the test service 114-TS type spawned by the launch manager 122 is determined by the test execution request requirements dispatched by the system controller 108. Irrespective of the test service 114-TS type, the lease manager 130 of the test system 114-TS is configured to register the test system attributes and a test system proxy with the Jini look up service 104. Again, like the machine service 114-MS, the test service 114-TS registers its availability to execute the test execution request with the Jini look up service 104 for a specified lease period. At this point, the system controller 108 downloads the test service proxy from the Jini look up service 104 and communicates with the test system proxy as if the system controller 108 is communicating with the test service 114-TS.

Once the test service 114-TS starts executing the job, the test service 114-TS sends an event to the system controller 108 indicating the commencement of the test execution request processing. In one embodiment, the test service 114-TS is designed to send additional events during the running of the test execution request and upon its conclusion. At the conclusion of running the test execution request, the call back component 126 is configured to communicate with the lease manager 130 signaling the conclusion of processing the test execution request. Once the lease manager 130 receives such communication, the lease manager 130 communicates with the Jini look up service 104 signaling the expiration of the test suite 114-TS lease with the Jini look up service 104. Upon the expiration of the test suite 114-TS lease with the Jini look up service 104, the test suite 114 proxy and test suite 114 attribute entries are removed from the Jini look up service 104, thus pointing out the availability of the test system 114 for processing another suitable job.

The test result data generated by the processing of the test execution request are collected, categorized, and maintained by the report manager 128. In one embodiment, the report manager 128 analyzes and generates a test report implementing the test result data. Thus, in one embodiment of the present invention, the test systems 114 of the DTF system generate test reports using the results generated by the processing of an associated test execution request. However, in a different embodiment, the test results generated by each test system 114 may be utilized so as to create a test result summary report, covering the test results produced by each of the test systems 114.

I. Distributed Process Runner

Figure 7:
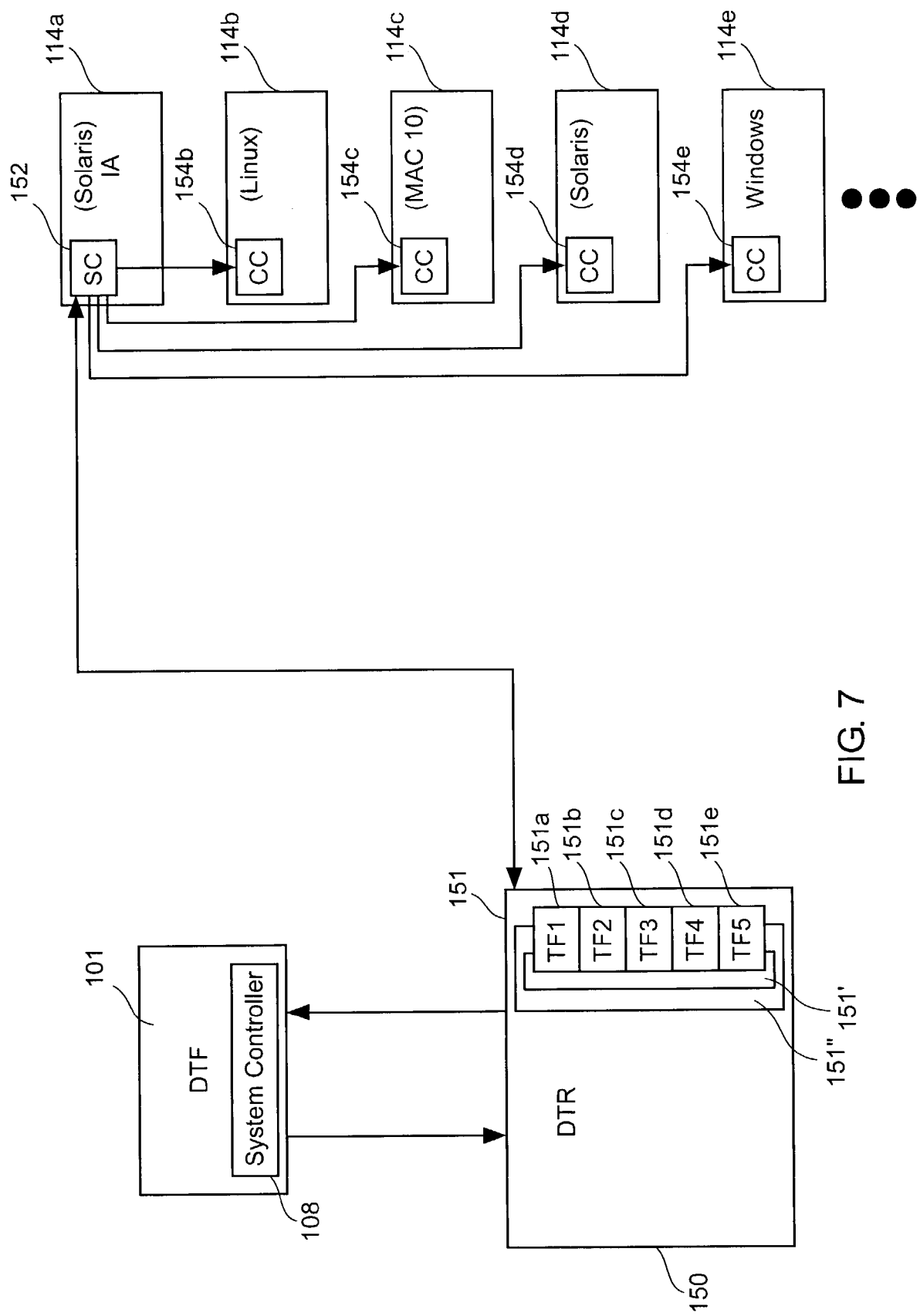
FIG. 7 is a block diagram showing an exemplary distributed test runner (DTR) managing and monitoring testing of an exemplary process using a plurality of test systems, in accordance with still another embodiment of the present invention.

Reference is made to a simplified block diagram of FIG. 7 illustrating an exemplary distributed test runner (DTR) 150 managing and monitoring testing of an exemplary process using a plurality of test systems 114a–114e, in accordance with one embodiment of the present invention. As shown, the system controller 108 of the DTF 101 provides the DTR 150 with all available data about all the test systems 114a–114e, registered with the Jini look up service. The DTR is shown to include a plurality of task directories 151, 151', and 151", each of which is designed to include a plurality of task files scheduled for execution. As shown, an exemplary directory 151 includes task files 151a–151e to be tested by the test systems 114a–114e.

As shown, a first task to be performed by the DTR 150 is launching of a Server controller 152 on a test system having a desired platform. In accordance with one embodiment, the test systems 114a–114e are searched so as to find a test system having the desired platform. For instance, in the embodiment of FIG. 7, the test system 114a is shown to have the desired Solaris IA platform. Once the test system 114a having the desired platform is located, the server controller 152 is launched on the test system 114a. In one example, the server controller 152 is a software code that is launched using the Internet. However, in a different embodiment, the server controller may be launched using any suitable mechanism.

Thereafter, the server controller 152 obtains all existing data about all of the available test system 114b–114e from the DTF system controller 108. In one example, the data obtained may include the IP Address for each of the test systems 114b–114e, operating system types, machines names, etc. Then, the server controller 152 designates all the remaining test systems 114b–114e as distributed test systems selected to execute the tasks. To designate the remaining test systems 114b–114e, the server controller 152 launches client server 154b–154e on each of the respective test system 114b–114e. In one instance, the client servers 154b–154e are software code launched on the respective test systems 114b–114e using the Internet.

At this point, the server controller 152 can communicate with the client servers 154b–154e. In one example, the server controller 152 communicates with the client servers 154b–154e using a respective thread. In a different embodiment, the server controller 152 may implement any appropriate mechanism capable of providing communication between the client controllers 154b–154e and the server controller (e.g., soap over http, socket communication, message queues, Remote Method Invocation (RMI), etc.).

As illustrated, the task directory 151 in DTR 150 includes a plurality of task files 151a–151e, scheduled to be tested by the test systems 114b–114e. In one embodiment, after the server controller 152 has been launched, the server controller 152 reads and obtains each task file 151a–151e in the task directory 151. Thereafter, task-flow-based scheduling, as provided in each task file 151a–151e, is implemented by the server controller 152 to schedule each task in each task group in each task file 151a–151e. In one example, the server controller 152 initiates assigning tasks starting with a first task group in the task file 151a. At this point, the server controller 152 determines the number of tasks in the first task group and the types of each respective operating system. Then, the server controller 152 searches the available test systems 114b–114e so as to find test systems having operating systems matching those required to execute the tasks in the first task group. For instance, the first task group includes four tasks to be executed on Linux, Mac 10, Windows, and Solaris operating systems. At this point, the server controller 152 searches the available test systems 114b–114e, looking for four test systems that have Linux, Mac 10, Windows, and Solaris operating systems, and are simultaneously available to execute the four tasks. Assuming that the test systems 114b–114e are all simultaneously available, the server controller 152 can select the test systems 114b, 114c, 114e, and 114d to respectively execute each of the four tasks.

Figure 8:
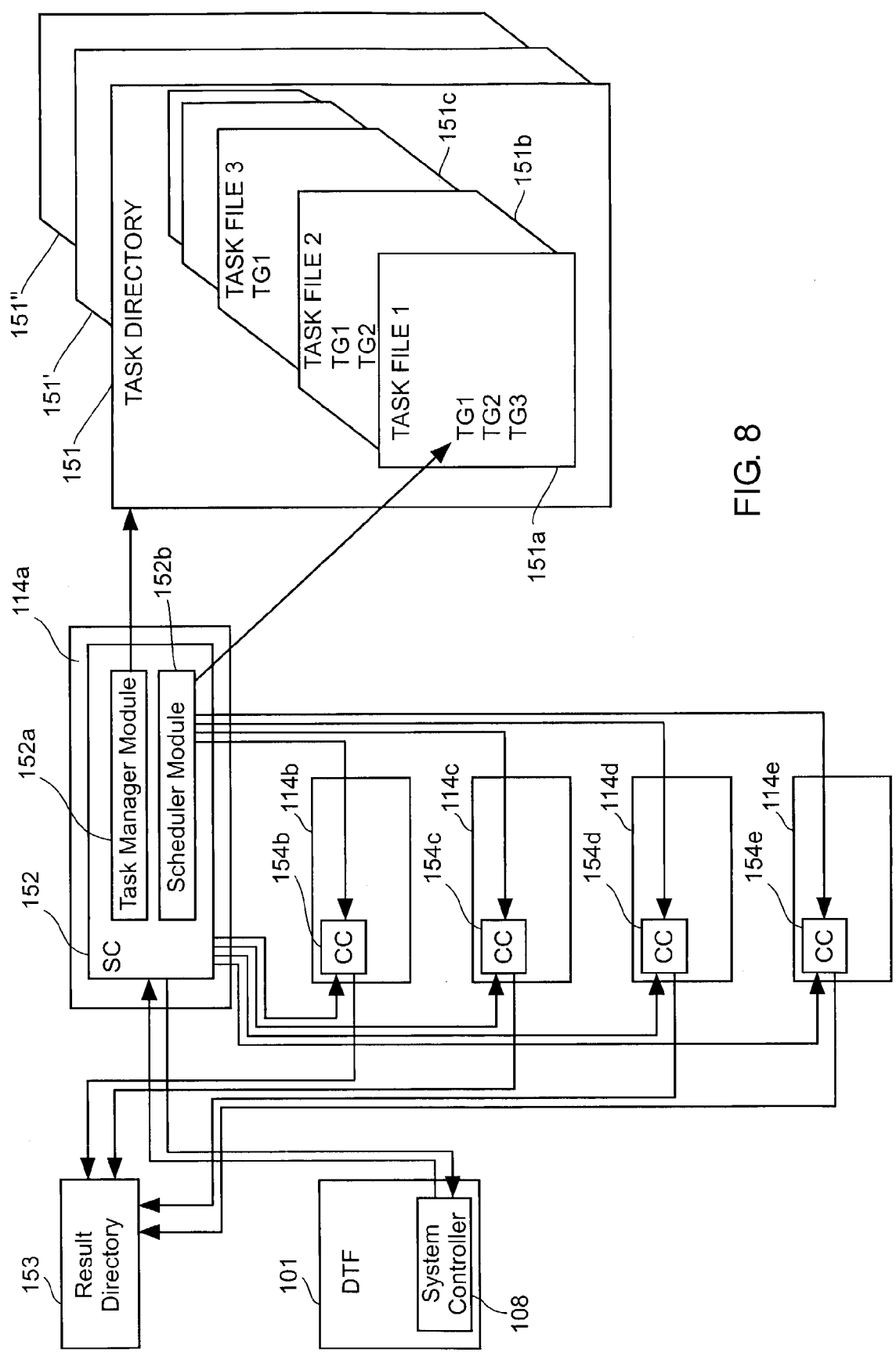
FIG. 8 is a block diagram showing the interactions between the service controller and client controllers of the distributed test runner, in accordance with still another embodiment of the present invention.

Continuing to FIG. 8, the interactions between the server controller 152 and client controllers 154b–e of the DTR system of the present invention can further be understood, in accordance with one embodiment. As shown, the server controller 152 launched on the test system 114a has designated test system 114b–114e, as test systems of the dynamic cross-platform network of test systems available for executing tasks. As such, the client controllers 154b–154e have been respectively launched on each of the test systems 114b–114e.

After the server controller 152 has been launched on the test system 114a, as illustrated, the server controller 152 communicates with the system controller 108 of the DTF 101, requesting that the system controller 108 provide the server controller 152 with all available data about all available test systems 114b–114e of the ad-hoc distributed test systems registered with the Jini look up service. Once the server controller 152 has been provided the requested data, control is passed from the system controller 108 of the DTF to the server controller 152 launched on the test system 114a.

In accordance with one embodiment of the present invention, the server controller 152 is configured to manage scheduling and execution of tasks on test systems 114b–114e. In one implementation, as shown in the embodiment of FIG. 8, the server controller 152 includes a task manager module 152a and a scheduler module 152b. According to one embodiment, the task manager module 152a is designed to look through each of the task files 151a–151e defined in the task directory 151, and assign each task, in each of the task groups TG1 through TG3 to test systems available to execute tasks. The task manager module 152b then communicates with the scheduler module 152b, requesting that the scheduler module 152b arrange a task in a particular task group in a given task file for execution.

By way of example, the task directory 151 is shown to include several task files 151b–151e. As shown, the first task file 151a has three task groups, the second task file 151b has two task groups, and the third task file 151c has one task group, etc. In one embodiment, the task manager module 152a starts with the first task file 151a in a selected directory, 151. The first task file 151a includes three task groups, with each task group including a plurality of tasks. At this point, the task manager 152b communicates with the scheduler module 152b, requesting that the execution of the first task group in the first task file 151a be initiated. As will be described in more detail below, the embodiments of the present invention start executing the plurality of tasks in the task group once all the test systems required to test each task in the task group are simultaneously available to execute their respective tasks. For instance, if only two test systems having two of the required platforms are available to execute two of the tasks in the TG1, the server controller 152 sets the two available test systems aside. However, server controller waits until the test systems having requirements (e.g., operating systems) matching those required by the remaining tasks. Meanwhile, the server controller 152 may proceed to execute the next task group TG2, if the TG2 can be executed independently of task group TG1. Once, the scheduler module 152b has located the required test systems that are all simultaneously available, the scheduler module 152b assigns the execution of a particular task to a test system having the matching platform (e.g., test systems 114b–114e).

In one example, the server controller 152 creates a new thread when initiating the execution of a new task group. Once the execution of the task group has concluded, the server controller 152 terminates that thread. In another embodiment, the server controller may implement a different mechanism to keep track of the tasks in each task group (e.g., enterprise java beans (e.g., session beans), Pre-initialized thread pools, etc.).

In one embodiment, once the test systems 114b–114e have finished executing their respective assigned tasks, the test systems 114b–114e may store their task execution results in each of their respective storage. In another embodiment, the server controller 152 may communicate to the user inquiring the user as to user's preference. At this point, once the server controller 152 has obtained a feedback from the user, the server controller 152 communicates user's preference to the client servers 154b–e. For instance, the user may request that the results be stored to either, a results directory 153, on each of their respective storage, or any other appropriate storage selected by the user.

It must be appreciated by one of ordinary skill in the art that although the embodiments of the present invention have been shown to implement each of the system controller, server controller, and client controllers on different computers, in one embodiment, the system controller, server controller, and client controllers can be launched on the same computer.

Figure 9A:
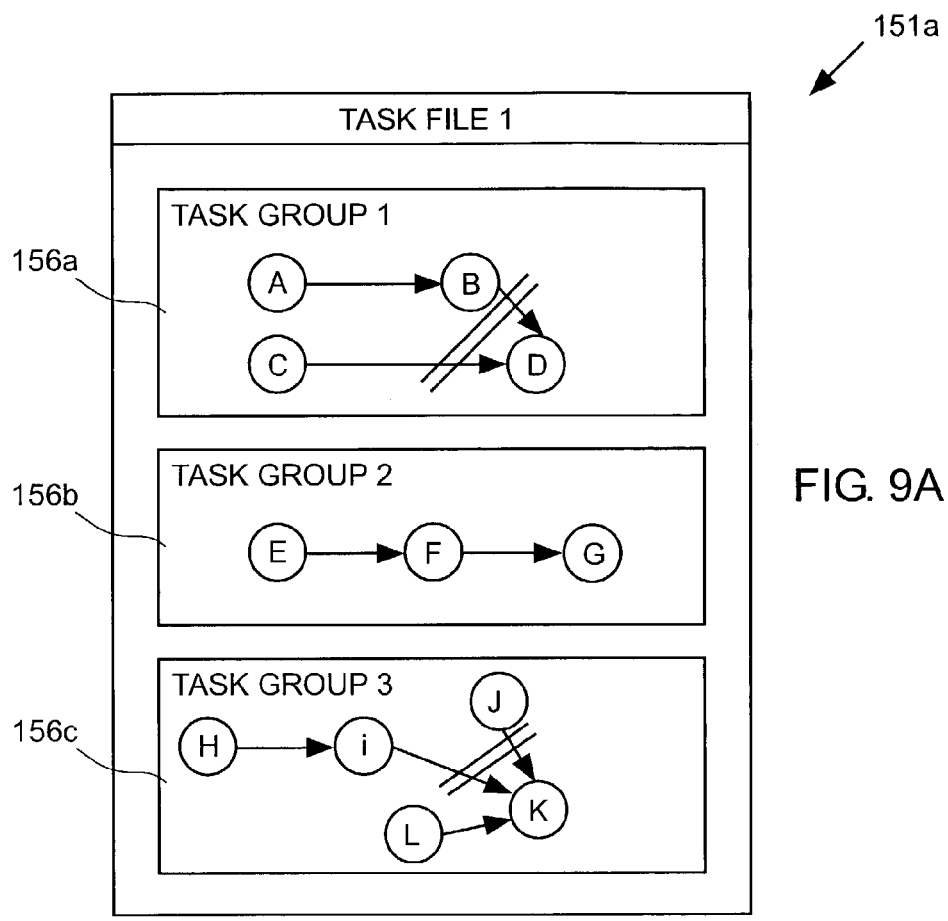
FIG. 9A is a block diagram showing an exemplary task file, in accordance with still another embodiment of the present invention.

FIGS. 9A–9D are simplified illustrations of an exemplary task file 151a, a task group file 159, a configuration file 174, and a machine.props file 176, in accordance with one embodiment of the present invention. The task file 151a of the embodiment of FIG. 9A is shown to have three task groups 156a–156c. As shown, the first task group 156a includes four tasks A, B, C, and D. As shown, the task-flow-based processing implemented in the task group 156a shows that tasks A and C are independent tasks, and as such, can be executed in parallel. Task B, is shown to be dependent on task A, and task D is illustrated to be executed after both tasks C and D have concluded.

Tasks E, F, and G in the second task group 156b are shown to have a sequential task-flow-base, while tasks H, I, J, K, and L of the third task group 156c are required to follow a more complicated task-flow-based arrangement. As shown, tasks H, J, and L can be executed in parallel while task I can be executed after execution of task H has concluded. In a like manner, task K can be executed after execution of tasks J, I, and L, have concluded. In the embodiment shown in FIG. 9A, if there exist enough available test systems with the desired operating systems, the task groups 156a–156c can be executed in parallel.

Figure 9B:
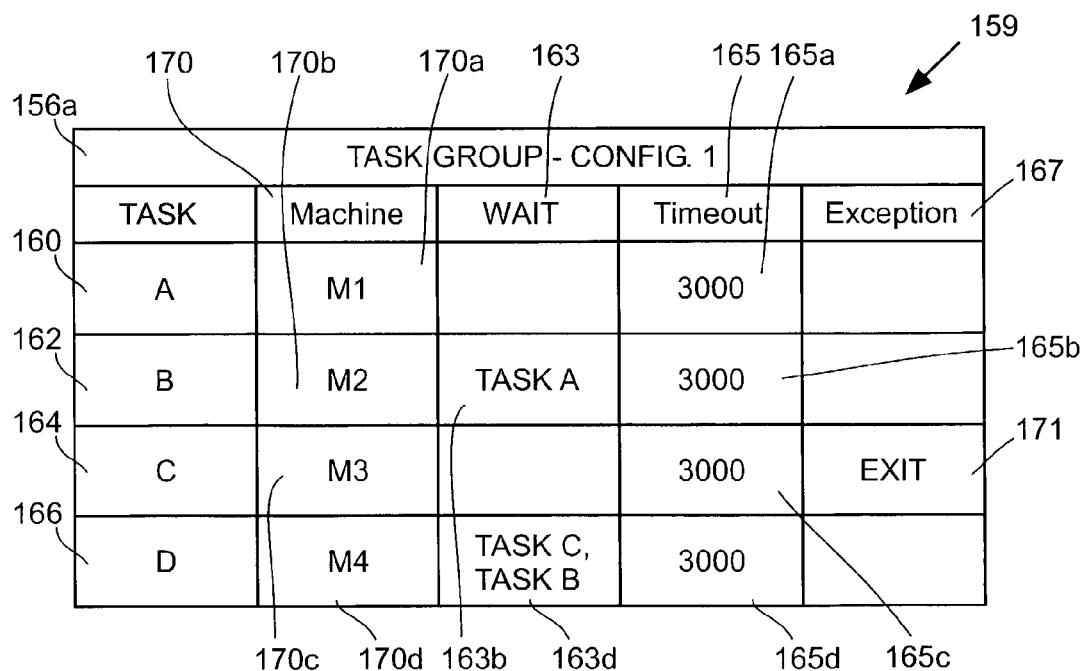
FIG. 9B is a block diagram showing an exemplary task group file, in accordance with still another embodiment of the present invention.

Continuing to FIG. 9B, an exemplary task group file 159 is shown. As illustrated, the task A 160 is assigned to be executed by an abstract machine M1, task B 162 is assigned to an abstract machine M2, task C 164 is assigned to abstract machine M3, and task D 166 assigned to abstract machine M4. The benefit of using the abstract machine information M1–M4 rather than actual test systems 114b–114e, is that abstract machine M1 can be a Linux machine in one configuration but in the next configuration be substituted for a Solaris IA machine. In this manner, the tests can be re-run in multiple configurations by having entries in the configuration file (e.g., platform file) without having to make any changes or modification to the task file. Additionally, machine information is generated at runtime, thus, depending on the configuration requested, the user may select a configuration at any time by simply changing the configuration according to their requirement without having to modify any tests or task files.

As discussed with regards to the embodiment of FIG. 9A, task B is configured to be executed after execution of task A has concluded. Thus, the embodiments of the present invention use a "Wait" variable to ensure that the task-flow-based arrangement in each task group and task file is followed properly. As shown in a box 163b, the task B 162 should wait until the execution of task A has concluded. In a like manner, execution of task D 166 cannot start until both task C and Task B in box 163d have concluded.

The embodiments of the present invention are designed to perform specific functions if a response has not been received from a test system for a predetermined period of time. As shown, using the "time out" 165 variable, any of the tasks A–D 160–166 can be terminated if executions of any task takes longer than 3000 seconds 165a–165d. Subsequently, in one embodiment, the terminated tasks or processing resources running the task may be restarted.

In a like manner, the embodiments of the present invention are capable of performing a corrective action if an exception occurs during execution of any of the tasks A–D 160–166. In one example, using an "exception" 167 variable, an alternative course of action is provided to the test system while running a specific task. As shown in FIG. 9B, in one embodiment, the exception 167 is anticipated to occur during execution of task C 164. Thus, when the exception occurs, the corrective action provided is executed and the task is terminated, as shown in 171. Accordingly, the embodiments of the present invention are capable of incorporating any exception anticipated to occur during execution of a given task or task group. In this manner, corrective actions to be performed in response to a given exception is implemented in the code, eliminating the need to communicate to the software programmer.

Figure 9C:
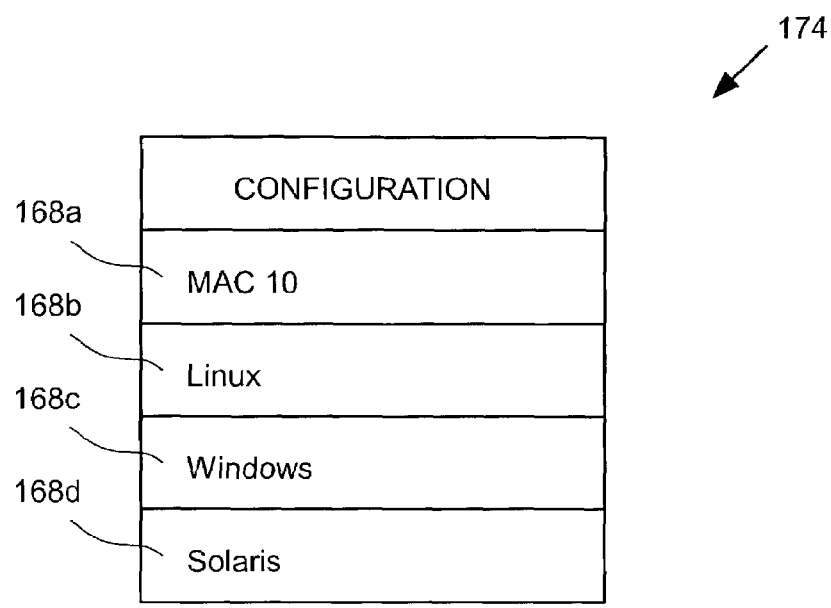
FIG. 9C is a block diagram showing of an exemplary configuration file, and a test system, in accordance with still another embodiment of the present invention.

FIG. 9C shows an exemplary configuration file 174, in accordance with one embodiment. As shown, the testing process is performed using test systems having platforms included in the configuration file. For instance, configuration 1 uses test systems having Mac 10 168a, Linux 168b, Windows 168c, and Solaris 168d operating systems, successively. In a different configuration, a different configuration implementing different operating systems in any selected order can be implemented. In one embodiment, the same test may be implemented using different configurations, so as to replicate scenarios where each of the web registries, service providers, and clients implement different platforms and operating systems.

Figure 9D:
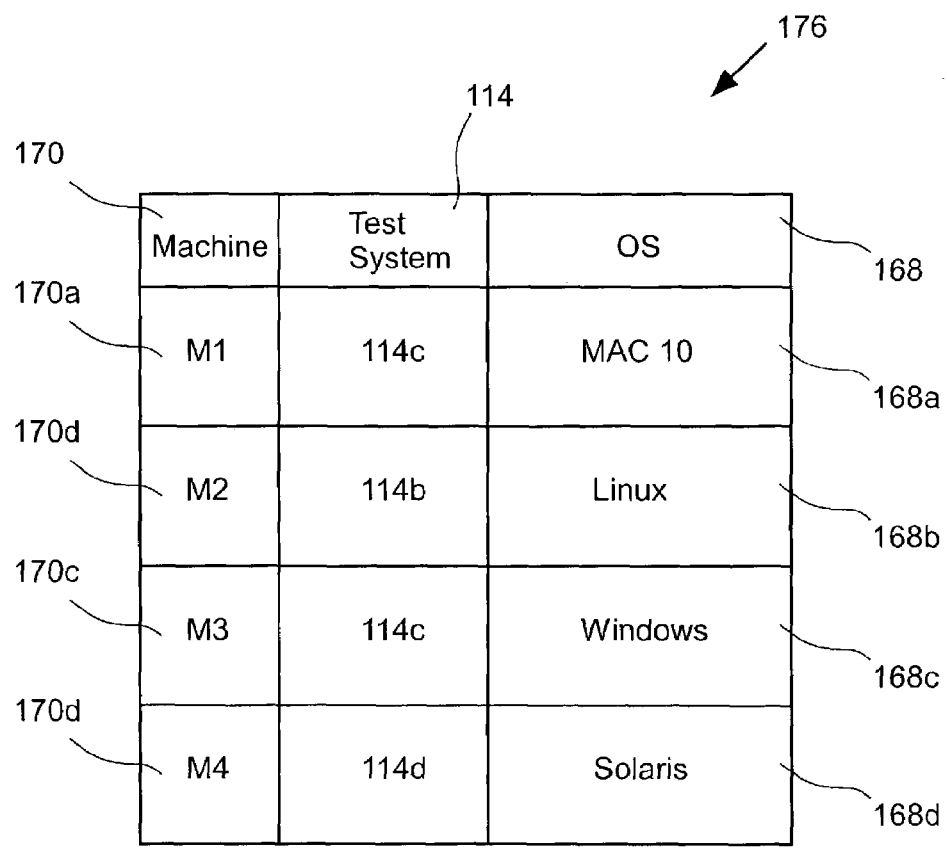
FIG. 9D is a block diagram showing an exemplary machine.props file, and a test system, in accordance with still another embodiment of the present invention.

FIG. 9D shows an exemplary machine.props file 176, in accordance with one embodiment of the present invention. As shown, the machine.props file 176 includes the name 114 and operating system 168 of each of the abstract machines M1–M4 170a–170d. As shown, abstract machine M1 170a is assigned to the test system 114c having the Mac 10 operating system 168a. The abstract machine M2 170b is assigned to the test system 114b having the Linux operating system 168b, abstract machine M3 170c is assigned test system 114e having the Windows operating system 168c, and abstract machine M4 170d is assigned to test system 114d having the Solaris operating system 168d. Thus, to execute task group 156a, using the configuration 1 file 174, all the test systems 114c, 114b, 114e, and 114d should be available simultaneously for the tasks A–D 168–168d in the task group 156a to be executed.

An exemplary <taskgroups> file is shown in Table 1.

TABLE 1

An Exemplary taskgroups File

```
<?xml version="1.0"?>
<!DOCTYPE taskgroups SYSTEM "taskgroups.dtd">
<taskgroups>
<taskgroup id="JAXMTests" configFile="platforms.xml" >
    <task machine="MACHINE1" id="task1" >
        <command> ant doall </command>
        <timeout> 3000</timeout>
```

TABLE 1-continued

An Exemplary taskgroups File

```
        <execDir>jaxm-test/test</execDir>
    </task>
    <task machine="MACHINE2" id="task2" wait="task1">
        <command> ant stopcatalina </command>
        <execDir>dtr-test</execDir>
    </task>
    <task machine="MACHINE2" id="task3" >
        <command> ant startcatalina </command>
        <timeout> 3000</timeout>
        <execDir>dtr-test</execDir>
    </task>
    <task machine="MACHINE2" id="task4" >
        <command>java com.sun.ejte.harness.StatusChecker 127.0.0.1
        8080 index.html 3000
</command>
        <timeout>3000</timeout>
        <onException>exit</onException>
    </task>
    <task machine="MACHINE1" id="task5" wait="task3,task4">
        <command> ant runtest </command>
        <execDir>jaxm-test/test</execDir>
    </task>
    <task machine="MACHINE2" id="task6" wait="task5">
        <command> ant stopcatalina </command>
        <execDir>dtr-test</execDir>
    </task>
</taskgroup>
</taskgroups>
```

As depicted, the <taskgroups> file includes the configuration file "platforms.xml" shown in Table 2. "Machine 1" is shown to be assigned the task having the task1 id. Machine 1 is assigned to execute an "ant doall" command, which in accordance with the embodiments of the present invention can be any appropriate command (e.g., execute, inquiry, clean, setup, build, deploy, etc.)

The "task id" values are implemented to control the task synchronization in the task groups. For instance, "task2" is configured to be executed after execution of task1 has completed. This is shown by assigning the value of "task1" to "wait" variable. The embodiments of the present invention are further capable of synchronizing more complex task-flow schedules (e.g., when execution of one task depends on completion of execution of more than one task). By way of example, "task5" is configured to be executed after execution of both "task3" and "task4" have completed. Thus, in one example, both tasks are assigned to variable wait, with the "task3" and "task4" being separated by a comma.

The taskgroups file further addresses the corrective action that can be taken when an exception occurs. Additionally, it is required that the predetermined period, which in this embodiment is about 3000 seconds, be implemented to interrupt execution of a task from which no response has been received.

Table 2 shows another exemplary taskgroups file. As illustrated, the exemplary taskgroups, configuration, and machine files are implemented using the extensible markup (XML) language. However, in a different embodiment, any suitable language maybe used to implement any of the files implemented (e.g., text files, property files,etc.).

TABLE 2

Taskgroups File

```
<!ELEMENT taskgroups (taskgroup+) >
<!ELEMENT taskgroup (task+) >
<!ATTLIST taskgroup id CDATA #REQUIRED >
<!ATTLIST taskgroup configFile CDATA #REQUIRED >
<!ELEMENT task (command, timeout? ,execDir? ,onException?) >
<!ATTLIST task
    machine ( MACHINE1|MACHINE2|MACHINE3|MACHINE4|
    MACHINE5 )
"MACHINE 1"
    id CDATA #REQUIRED
    wait CDATA #OPTIONAL >
    <!ELEMENT command (#PCDATA) >
    <!-- timeout is mentioned in seconds -->
    <!ELEMENT timeout (#PCDATA) >
    <!ELEMENT execDir (#PCDATA) >
    <!ELEMENT onException (#PCDATA) >
```

As illustrated in Table 3, the task groups in the taskgroups file 158 are to be tested using two different configurations. As shown, in configuration 1, machine 1 is required to have a Linux operating system while Machine 2 is required to have a Solaris 5.8 operating system. In configuration 2, however, machine 1 is required to have a Windows operating system while Machine 2 is required to have a Linux operating system.

TABLE 3

Exemplary Configuration File

```
<?xml version="1.0"?>
<!DOCTYPE platforms SYSTEM "platforms.dtd">
<platforms>
    <configuration id="1">
        <os>Linux</os>
        <os>Solaris 5.8</os>
    </configuration>
    <configuration id="2">
        <os>Windows 2000</os>
        <os>Linux</os>
    </configuration>
</platforms>
```

Table 4 includes the machine.props file, which in this embodiment, shows that name of Machine 1 is Steffi and that has a Linux operating system. As shown, Machine 2 is called skyblue and has a SunOS operating system.

TABLE 4

Exemplary Machine.props File

```
MACHINE1.name=steffi
MACHINE1=129.145.132.73
MACHINE1.os=Linux
MACHINE2.name=skyblue
MACHINE2=129.145.132.59
MACHINE2.os=SunOS
```

Reference is made to FIGS. 10A–10C depicting simplified snap shots of available and busy processing resources at any given time, according to one embodiment of the present invention. As shown in FIG. 10A, the test systems 114 are shown to be divided into two categories of test systems, available test systems 114' and their respective operating systems, and busy test systems 114" and their respective operating systems. As discussed with respect to the embodiments of FIGS. 9A–9D, all the test systems 114c, 114b, 114e, and 114d should be available simultaneously for the tasks A–C in the first task group 156*a* to be executed. However, as shown in the snapshot of FIG. 10A, while test system 114*c* and 114*e* are available, test systems 114*b* and 114*d* are currently being used to execute a different task. Thus, at this point, execution of tasks A–C in the task group 156*a* is halted until all the required test systems are available. As shown, none of the available test systems 114*h*–*k* has a Linux or Solaris operating system. As a result, a different test system cannot be substituted for any of the test systems 114*b* and 114*d*. As shown, test systems 114*f*, 114*l*, 114*m*, and 114*n* are busy.

Proceeding to the snapshot in FIG. 10B, test system 114*b* is shown to be free, however, test system 114*d* is till in use. As can be seen, none of the available test systems 114*h*, 114*m*, and 114*k* is shown to have a Solaris operating system. As shown, test systems 114*i* and 114*j* which were previously available for use, are no longer available. At this point, test systems 114*h*, 114*m*, and 114*k* are available, while test systems 114L, 114*n*, 114*i*, and 114*j* are busy.

Continuing to snapshot in FIG. 10C, all four test systems 114*b*–*e* are shown to be available. As such, tasks A–D of the first task group 156*a* can now be assigned to test systems 114*b*–114*e*, as test systems 114*b*–114*e* have the required operating systems and are all simultaneously available. Thus, in accordance to one embodiment of the present invention, execution of a task group is initiated when all test systems necessary to execute each of the tasks in the particular task group are all available at the same time.

In accordance with one embodiment of the present invention, the DTR of the present invention implements three queues to manage and monitor the tasks to be executed. A "ToBeServiced" queue stores all tasks to be performed. An "InService" queue is implemented to store tasks currently being executed, while a "Serviced" queue is implemented to store the tasks which execution has concluded.

Figure 11:
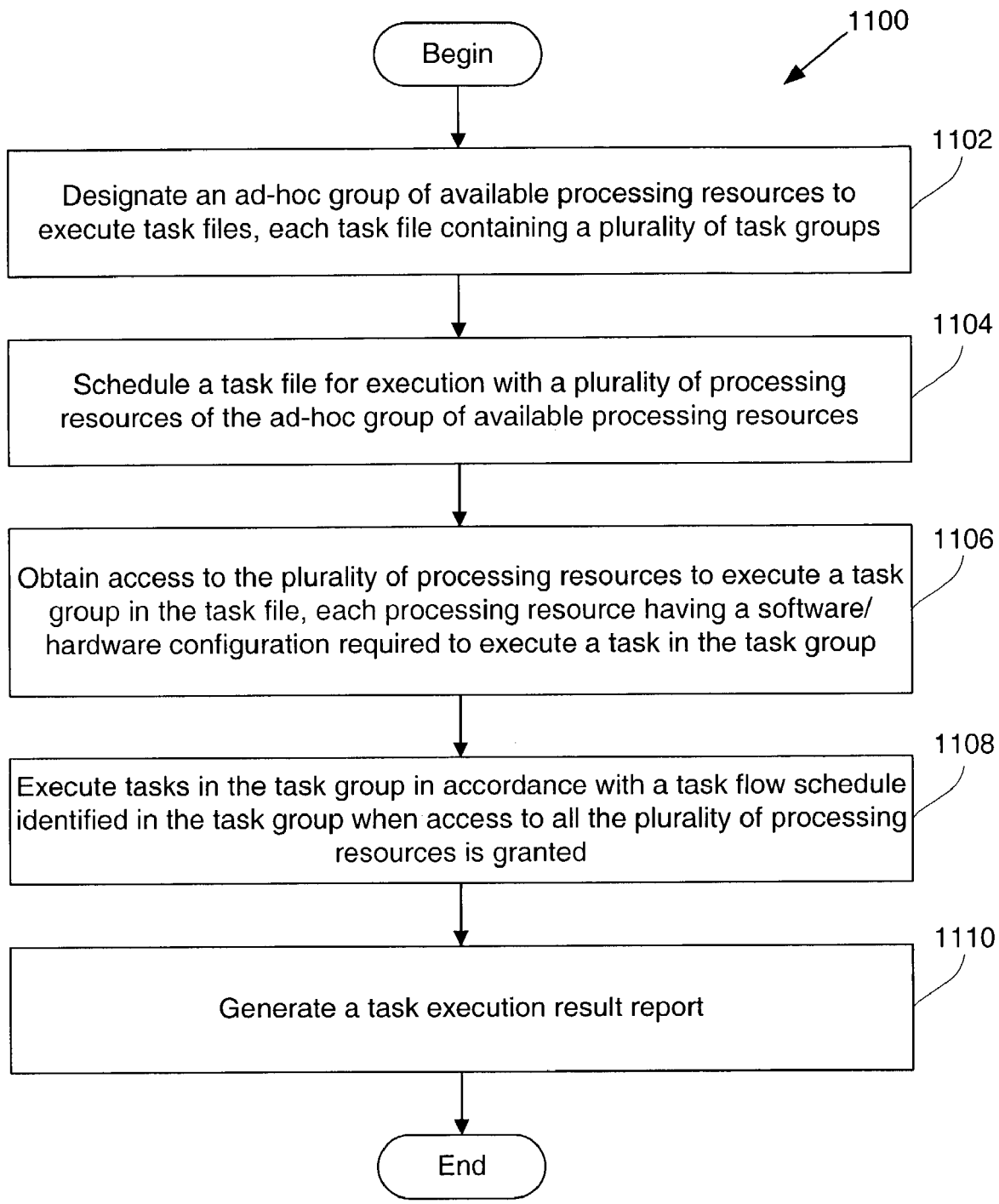
FIG. 11 depicts a flowchart diagram of method operations performed by an exemplary distributed process runner (DPR) system, in accordance with still another embodiment of the present invention.

FIG. 11 depicts a flowchart 1100 depicting method operations performed by a distributed process runner (DPR) system, in accordance with one embodiment of the present invention. The method begins in operation 1102 in which an ad-hoc group of available processing resources are designated to execute a plurality of tasks files. Each task file may include a plurality of task groups, with each task group containing a plurality of tasks to be scheduled in accordance with a task-flow-based schedule. By way of example, this is achieved by starting up the look up service and running machine services on each of the processing resources. Then, the system controller is started on a server and all data (e.g., attributes and proxies) of each processing resource is obtained by the system controller. The server controller is launched on one of the processing resources and the client controller is launched on each of the remaining processing resources. In one example, the server controller reads all the machine related information and writes same to a machine.props file. In one example, the machine.props file includes each of the Internet protocol (IP) addresses for each of the abstract machines.

The method then proceeds to operation 1104 in which a task file is scheduled for execution with a plurality of processing resources of the ad-hoc group of available processing resources. In operation 1106, access is obtained to the plurality of processing resources to execute a task group in the task file. Each of the processing resources has a software/hardware configuration required to execute a task in the task group. In one example, a "task.xml" file containing each technology to be provided. By way of example, the task.xml file may include the command to be executed, abstract machine name to be used to execute the task and Wait, Timeout, and OnException variables. In one example, a "TaskGenerator" utility program is implemented to read the task.xml file so as to create a list of tasks to be performed.

Proceeding to operation 1108, when access to all the processing resources is granted, tasks in the task group are executed in accordance with the task-flow-based schedule identified in the task group. In one example, the server controller reads the task.xml file and based on the abstract machine names provided in the task.xml file, the server controller invokes a RequestHandler utility program to dispatch the command to the client controller on the specific processing machine. In one example, the client controller reads and executes the dispatched command and reports the status of execution to the RequestHandler. At this point, the server controller gets the status from the RequestHandler and schedules the next task, accordingly. Then, in operation 1110 a task execution result report is generated.

In one exemplary embodiment, the DTR system of the present invention is set up as provided in Table 5.

TABLE 5

Exemplary Execution Procedure

Figure 12:
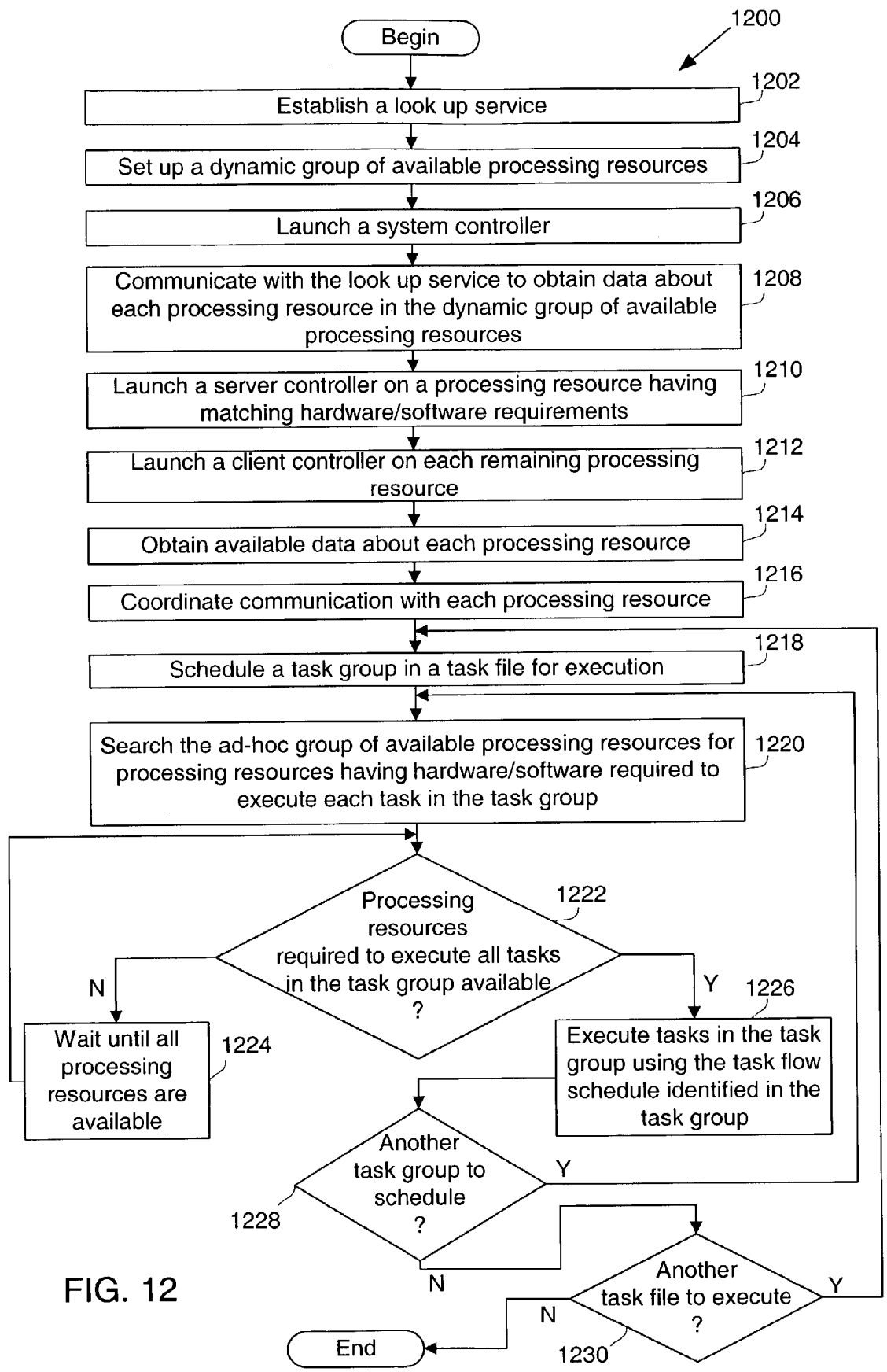
FIG. 12 depicts a flowchart diagram depicting method operations performed by a distributed process runner (DPR) system, in accordance with still another embodiment of the present invention.

Setup
    Edit unixDTR.ksh/winDTR.ksh under DTR/cos-ws
        DTR-TASK-HOME
        DTR-TASK-WIN
        RESULT-DIR-PATH
        JAVA-HOME
        CATALINA-HOME
    Edit information about the machines in testbed/dtr-test,
    then do "shsetup.sh"
Provide Task Information
    Put task files under taskdir
Providing platform (configuration) information
    Put platform.xml under config directory
Provide task information of DTR to DTF
    Put wsharness_list.xml to in-queue directory FIG. 12 depicts a flowchart 1200 depicting method operations performed by a distributed process runner (DPR) system, in accordance with another embodiment of the present invention. The method begins in operation 1202 in which a look up service is established proceeding to operation 1204 in which a dynamic group of available processing resources is set up. Next, in operation 1206 a system controller is launched followed by operation 1208 in which the system controller of the distributed processing system communicating with the look up service to obtain data about each processing resource in the dynamic group of available processing resources. Continuing to operation 1210, the system controller launches a server controller on a processing resource that has hardware/software requirements matching those of the server controller. Next, in operation 1212, the server controller launches a client controller on each remaining processing resource.

Available data about each processing resource is then obtained in operation 1214 followed by the server controller coordinating communication with each processing resource. In one example, the server controller implements a separate thread to communicate with each client controller. Then, in operation 1218, a task group in a task file is scheduled for execution. In operation 1220, the ad-hoc group of available processing resources is searched for processing resources having hardware/software required to execute each task in the task group.

Continuing to operation 1222, it is determined whether the processing resources required to execute all tasks in the task group are available. If all the processing resources are not available, the method proceeds to operation 1224 in which the method waits until all the processing resources are available.

Otherwise, the method continues to operation 1226 in which tasks in the task group are executed using the task-flow-based schedule identified in the task group. Then, the method continues to operation 1228 in which a determination is made as to whether there exists another task group to be scheduled. If another task group to be scheduled exists, the method continues to operation 1220, otherwise, the method continues to operation 1230 in which a determination is made as to whether there exists another task file to be executed. If another task file to be executed exists, the method continues to operation 1218.

In accordance with one implementation, the embodiments of the present invention can be used to test web services and the interactions with each combination of web service provider, web registry, and web clients, each having different software/hardware configurations. In fact, embodiments of the present invention can test interactions between multiple service providers registered with multiple web registries for use by multiple clients, each implementing different technologies.

By way of example, the processing resources used to test each interaction or web service belong to a dynamic group of undedicated processing resources having different requirements (i.e., hardware/software configurations). As such, matching the processing resources having a similar configuration as the service provider, registry, or client is rather easy. For instance, interactions between service providers implemented using different technologies, (e.g., J2EE based, .net compatible server, etc.), with different web registries (e.g., universal descriptive and discovery Interface (UDDI), electronic business XML (EDXML), etc.) using different types of web registry documents (e.g., web service description language (WSDL), simple object access protocol (SOAP), etc.), and web clients based on different types of technologies (e.g., JSPS servlet, J2EE container based client, Java™ application based client, etc.) can always be tested using processing resources having matching hardware/software configurations.

Additionally, the embodiments of the present invention can easily be implemented to test synchronization of interactions between the web registries, service providers, and clients. For instance, using the wait variable, the service provider can be ensured that the web registry is up and running prior to publishing of the service provider's services on the web registry. Using the wait variable, in a like manner, the client can easily ensure that the web registry is up and running prior to communicating a request for a web service. Similarly, the client can further be sure that the service provider is running prior to the client communicating a request to the service provider.

Additionally, the embodiments of the present invention are able to test the interactions between the components automatically, minimizing the human intervention. By way of example, using the embodiments of the present invention, the interactions are tested when all the necessary number of processing resources are simultaneously available and are task-flow-based, significantly limiting human intervention. In a like manner, the embodiment of the present invention can perform corrective actions in case an exception or a time out occurs.

The advantages of the present invention are numerous. Most notably, the present invention substantially limits human intervention in distributed testing of web services and enterprise applications using ad-hoc network of computer resources. Another advantage is that the embodiments of the present invention can be implemented to test web services offered by multiple web service providers registered with multiple registries for use by multiple clients. Each of the web service providers, registries, and clients can be implemented on different technologies and operating systems. Yet another advantage is that the embodiments of the present invention are capable of coordinating interaction between each combination of web service provider, web registry, and web client. Still another advantage is that the embodiments of the present invention can synchronize sequence of tasks pursuing a task-flow-based scheduling. Still another advantage of the present invention is that a plurality of tasks can be executed simultaneously or in parallel, implementing the ad-hoc dynamic processing resources.

Still another advantage is that attaching and detaching of a computer resource has substantially minimum or no effect on the process execution. Furthermore, the embodiments of the present invention implement computer resources, which are not limited to be used by the DPR or DPF systems. As such, the embodiments of the present invention substantially eliminate the waste of resources associated with the prior art. Another advantage of the embodiments of the present invention is that the DTR system of the present invention is highly scalable, requiring minimum/none administration. Still another benefit of the present invention is that the ad-hoc network of distributed computer resources in conjunction with the server component creates a self-healing network. Yet another benefit of the present invention is that the network of computer resources can in fact span over a large geographical area.

With the above embodiments in mind, although the present invention mainly describes exemplary embodiments of a distributed test framework system designed to execute a test suite or a distributed test runner to test a task file, it must be understood by one having ordinary skill in the art that the distributed processing framework and distributed process runner of the present invention can be implemented to run any computer process. Additionally, the embodiments of the present invention can be implemented to test J2EE application server or any other J2EE application. Furthermore, the embodiments of the present invention may be configured to implement J2EE technology (e.g., EJBs, etc.). Moreover, although the present invention is described based on the Jini technology, other network technologies having the capability to create an ad-hoc group of computer resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

It should be understood that the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processing system, comprising:
    a computer system executing a system controller component and a service component, the service component including a look up service;
    a main processing resource of a plurality of processing resources, the main processing resource executing a server controller component, the main processing resource configured to register with the look up service indicating an availability of the main processing resource to process a software processing task having a set of requirements; and
    a plurality of remaining processing resources of the plurality of processing resource, each remaining processing resource executing a client controller component, each client controller component being launched by the server controller component, the plurality of remaining processing resources configured to register with the look up service indicating availability of each of the plurality of remaining processing resources to process a given software processing task having a set of requirements,
    wherein the system controller component searches the look up service so as to obtain data about the main processing resource and the remaining processing resources, providing the server controller component with data about the main processing resource and the plurality of remaining processing resources, and further wherein the server controller component is configured to communicate with each client controller component so as to locate a set of free remaining processing resources to execute software processing tasks in a particular software processing task group of a plurality of task groups of a task file following a task-flow-based schedule.

2. The processing system as recited in claim 1, wherein the server controller component includes,
    a task management module configured to search the remaining processing resources so as to locate the set of free remaining processing resources to execute the software processing tasks; and
    a scheduler component configured to schedule the software processing tasks with the set of free remaining processing resources located by the task management module.

3. The processing system as recited in claim 2, wherein the software processing task in the particular software processing task group can be executed if each of the free remaining processing resources in the set free remaining processing resources has a set of criteria matching the set of requirement of each task in the particular software processing task group.

4. The processing system as recited in claim 3, wherein each task in the particular software processing task group can be executed if all the free remaining processing resource of the set of free remaining processing resources are simultaneously available to execute each software processing task in the particular software processing task group.

5. The processing system as recited in claim 4, wherein software processing tasks in the particular software processing task group is processed in parallel.

6. The processing system as recited in claim 1, wherein the software processing tasks are one of web services, shell scripts, make file based systems, and ant based systems.

7. The processing system as recited in claim 1, wherein the software processing task groups can be processed in parallel.

8. A method for processing a computer software process including a task file, the method comprising:
    designating a group of available processing resources to execute the task file, the task file including task groups, each task group including a plurality of tasks;
    launching a server controller code on a main processing resource of the group of available processing resources;
    scheduling the task groups in the task file for execution with a plurality of remaining processing resources of the group of available processing resources, each remaining processing resource running a client controller code, each client controller code having been launched by the server controller code;
    obtaining access to a set of free remaining processing resources of the plurality of remaining processing resources each having a set of criteria matching a set of requirements of each task in a particular task group;
    executing the tasks in the particular task group when access to all the free remaining resources in the set of the free remaining processing resources have been granted; and
    generating an execution result report.

9. The method as recited in claim 8, wherein designating a group of available processing resources to execute the task file includes,
    registering each processing resource in the group of available processing resources with a look up service.

10. The method as recited in claim 9, wherein the look up service is a Jini™ look up service.

11. The method as recited in claim 8, wherein scheduling the task groups in the task file for execution with the plurality of remaining processing resources each running the client controller component code includes, obtaining data about each processing resource in the group of available processing resources from the look up service;

communicating the data with the main processing resource running the server controller code;

searching the plurality of remaining processing resources so as to locate the set of free remaining processing resources to execute the tasks in the particular task group; and scheduling the tasks with the set of free remaining processing resources located by a task management module.

12. A system for distributing, scheduling, and managing process execution, the system comprising:

a main processing resource executing a server controller component, the main processing resource configured to register with a look up service indicating an availability of the main processing resource to schedule software processing task groups for execution, each software processing task group including a plurality of tasks, each task having a set of requirements; and a plurality of remaining processing resources, each remaining processing resource executing a client controller component, each client controller component being launched by the server controller component, the plurality of remaining processing resources configured to register with the look up service advertising an availability of each of the plurality of remaining processing resources to process a software processing task having a set of requirements, wherein the main processing resource is configured to communicate with a system controller component to obtain data as to execution of a particular software processing task group configured to follow a task-flow-based schedule.

13. The system as recited in claim 12, wherein the system is implemented in a distributed process runner (DPR).

14. The system as recited in claim 12, wherein the system controller component searches the look up service so as to obtain data about the main processing resource and the plurality of remaining processing resources.

15. The system as recited in claim 14, wherein the server controller component is configured to communicate with each client controller component so as to locate a set of free remaining processing resources to execute tasks in the particular software processing task group following the task-flow-based schedule.

16. The system as recited in claim 12, wherein the server controller component includes, a task management module configured to search the plurality of remaining processing resources so as to locate a set of free remaining processing resources to execute the tasks; and a scheduler component configured to schedule the tasks with the set of free remaining processing resources located by the task management module.

17. A plurality of processing resources, the plurality of processing resources comprising:

a client controller component configured to communicate with a server controller component being run on a main processing resource, the client controller component being launched by the server controller component, wherein the main processing resource is configured to register with a look up service indicating an availability of the main processing resource to process a software processing task in a plurality of software processing task files; and a plurality of remaining processing resources of the plurality of processing resources, the plurality of remaining processing resources configure to register with the look up service indicating availability of each of the plurality of remaining processing resources to process a given software processing task having a set of requirements, and further wherein a system controller component is configured to search the look up service so as to obtain data about the main processing resource and the processing resource available to execute the software processing task.

18. The processing resources as recited in claim 17, wherein the software processing task is one of web services, shell scripts, make file based systems, and ant based systems.

19. The processing resources as recited in claim 17, wherein the software processing task in a software processing task group is executed if the processing resource has a set of criteria matching a set of requirement of the software processing task.

20. The processing resources as recited in claim 19, wherein the software processing tasks in the software processing task group follow a task-flow-based schedule.

* * * * *